US012225351B2

(12) United States Patent

Zahedi et al.

(10) Patent No.: US 12,225,351 B2

(45) Date of Patent: Feb. 11, 2025

(54) HEARING DEVICE WITH MINIMUM PROCESSING BEAMFORMER

(71) Applicant: Oticon A/S, Smørum (DK)

(72) Inventors: Adel Zahedi, Smørum (DK); Michael Syskind Pedersen, Smørum (DK); Thomas Ulrich Christiansen, Smørum (DK); Lars Bramsløw, Smørum (DK); Jesper Jensen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 17/575,968

(22) Filed: Jan. 14, 2022

(65) Prior Publication Data

US 2022/0240026 A1 Jul. 28, 2022

(30) Foreign Application Priority Data

Jan. 18, 2021 (EP) .................................... 21151965

(51) Int. Cl.

*H04R 25/00* (2006.01)

*G10L 25/78* (2013.01)

(52) U.S. Cl.

CPC ............ *H04R 25/502* (2013.01); *G10L 25/78* (2013.01); *H04R 25/50* (2013.01); *G10L 2025/783* (2013.01); *H04R 2225/43* (2013.01)

(58) Field of Classification Search

CPC ............................ H04R 25/50; H04R 2225/43

(Continued)

(56) References Cited

U.S. PATENT DOCUMENTS

| | | | |
|---|---|---|---|
| 5,511,128 A | 4/1996 | Lindemann | |
| 10,622,004 B1 * | 4/2020 | Zhang | G10L 25/78 |

(Continued)

FOREIGN PATENT DOCUMENTS

| | | |
|---|---|---|
| EP | 2 701 145 A1 | 2/2014 |
| EP | 3 471 440 A1 | 4/2019 |

(Continued)

OTHER PUBLICATIONS

Extended European Search Report for European Application No. 22150697.5 dated Nov. 17, 2022.

(Continued)

*Primary Examiner* — Katherine A Faley

(74) *Attorney, Agent, or Firm* — Birch, Stewart, Kolasch & Birch, LLP

(57) ABSTRACT

A hearing device adapted for being worn at or in an ear of a user, comprises a) an input unit comprising at last two input transducers each for converting sound around said hearing device to an electric input signal representing said sound, thereby providing at least two electric input signals; b) a beamformer filter comprising a minimum processing beamformer defined by optimized beamformer weights, the beamformer filter being configured to provide a filtered signal in dependence of said at least two electric input signals and said optimized beamformer weights; c) a reference signal representing sound around said hearing device; d) a performance criterion for said minimum processing beamformer. The minimum processing beamformer is a beamformer that provides the filtered signal with as little modification as possible in terms of a selected distance measure compared to said reference signal, while still fulfilling said performance criterion. The optimized beamformer weights are adaptively determined in dependence of said at least two electric input signals, said reference signal, said distance measure, and said performance criterion. A method of operating a hearing device is further disclosed. The invention may e.g. be used in hearing aids or headsets.

18 Claims, 7 Drawing Sheets

(58) Field of Classification Search
USPC .......................................................... 381/312
See application file for complete search history.

(56) References Cited

U.S. PATENT DOCUMENTS

| | | | | |
|---|---|---|---|---|
| 2017/0256269 | A1 | 9/2017 | Jensen et al. | |
| 2017/0347206 | A1 | 11/2017 | Pedersen et al. | |
| 2019/0082276 | A1* | 3/2019 | Crow | H04R 25/505 |
| 2019/0110135 | A1* | 4/2019 | Jensen | H04R 25/505 |
| 2019/0349692 | A1* | 11/2019 | Best | H04R 25/505 |

FOREIGN PATENT DOCUMENTS

| | | | |
|---|---|---|---|
| EP | 3 672 280 | A1 | 6/2020 |
| WO | WO 2007/140799 | A1 | 12/2007 |

OTHER PUBLICATIONS

Partial European Search Report dated Jun. 21, 2022 for Application No. 22150697.5.

* cited by examiner

HEARING DEVICE WITH MINIMUM PROCESSING BEAMFORMER

TECHNICAL FIELD

The present application relates to hearing aids or headsets, in particular to noise reduction in hearing aids or headsets.

SUMMARY

Most modern hearing aids or headsets are equipped with directional noise reduction systems that are able to significantly suppress noise sounds that arrive from different angles than the target speech. While this might be desirable when there is too much noise, it may backfire in many other situations due to its inherent propensity to separate the user from the ambient sounds or the tendency to distort the target speech.

Further, most of the existing enhancement techniques that are implemented in state-of-the-art hearing aids or headsets either offer a high level of noise reduction in price of distorting the speech signal, or to preserve the speech quality at the price of inferior noise reduction performance. A beamformer that achieves the best of the two worlds (i.e. reducing noise as efficiently as the existing aggressive noise suppression beamformers, while fully preserving the speech quality) has not been developed yet.

It is e.g. a common complaint among hearing aid users that their hearing aids tend to over-process sound in many situations, lead to a sense of tunnel hearing and detachment from the surroundings.

In the present disclosure, an enhancement system that aims at producing a natural output sound that is as close as possible to the original noisy microphones signals is provided. This is achieved by a beamforming rationale that keeps the processing of the microphone signals to a minimum level that is necessary to obtain a fully intelligible speech signal. The output of the resulting enhancement system is composed of two components: the original microphone signal and a processed version, where noise is suppressed. These two components are then dynamically combined to produce an output signal that adapts to the situation: When there is a lot of noise (and therefore noise is interfering with speech intelligibility), the dynamic combination leans toward the noise-reduced component. When there is not much noise (and therefore noise is perceived as benign ambient sound), the dynamic combination leans toward the original unprocessed microphone signal. A beamforming rationale like the proposed method, which offers a systematic way of limiting the processing of the microphone signals to a minimum necessary, has not been addressed in the literature before. The ideas are described in detail in [Zahedi et al.; 2021].

Further, an existing beamformer, which aggressively suppresses noise at the price of distorting speech is introduced as a reference beamformer. We then design a beamforming system that has a behavior as close as possible to the reference beamformer, provided that some level of preservation of the output speech is achieved. With this approach, the resulting enhancement system inherits the strong noise reduction properties of the reference beamformer, only when it would not harm the speech significantly. The resulting system is composed of a dynamic linear combination of the reference beamformer and a speech-preserving beamformer. Depending on the situation (noise and speech powers, etc.), this linear combination may lean toward either one of the two beamformers, or use comparable proportions of the two beamformers. In other words, the weights of the linear combination providing the reference beamformer may be larger than or equal to zero and smaller than or equal to one. The sum of the weights of the linear combination may be equal to one. Our experiments confirm that the proposed enhancement system provides strong noise suppression performance (comparable to or better than the state-of-the-art), while keeping the target speech essentially undistorted.

The multi-channel Wiener filter (MWF) together with its variations arguably make up the most commonly discussed beamformers in the acoustic signal processing community. The speech distortion weighted generalization of the MWF proposed in covers a large and popular family of beamformers including the minimum variance distortion-less response (MVDR) beamformer and the standard MWF. The principle underlying the rationale for this family of beamformers is the intrinsic undesirability of noise. The ideal, therefore, is to remove the noise such that only clean speech is left. This rationale can be limiting, and in some setups, even unrealistic.

There are numerous real-life scenarios, where noise provides context in terms of spatial perception, ambient awareness, etc. In such cases, it is desirable to reduce noise only to the extent that ensures sufficient intelligibility for the target speech. The above-mentioned rationale is clearly not suitable for this purpose. Another typical issue with the MWF and its generalizations is significant distortions of speech as a price for high levels of noise suppression.

In the present disclosure, a new rationale that allows for more general and flexible formulations, while covering the classic rationale as a special case is presented. The proposed rationale is based on minimizing the distance between the beamformer output and a given reference signal subject to a certain performance constraint. In particular, an example is presented, where the distance measure is based on the mean-square error (MSE) and the performance criterion is an intelligibility estimator inspired by the speech intelligibility index (SII) (cf. [ANSI-S3-22-1997]). Depending on the choice of the reference signal, the proposed rationale can lead to ambient preserving beamformers or aggressive noise suppressing beamformers, or simply reduce to the existing family of MWF beamformers.

It should be noted that in addition to the MWF family of beamformers, which is the main focus of this disclosure, alternative approaches to beamforming have been proposed. Examples include robust beamforming, sparsity-based beamforming, DNN-based beamforming, and echo aware beamforming. Furthermore, this work is primarily focused on beamforming for human end users, e.g. hearing assistive devices. Other applications of beamforming may e.g. be in automatic speech recognition.

A Hearing Device:

In an aspect of the present application, a hearing device, e.g. a hearing aid, adapted for being worn at or in an ear of a user, is provided. The hearing device may comprise

- an input unit comprising at last two input transducers each for converting sound around said hearing device to an electric input signal representing said sound, thereby providing at least two electric input signals;
- a beamformer filter comprising a minimum processing beamformer defined by optimized beamformer weights, the beamformer filter being configured to provide a filtered signal in dependence of said at least two electric input signals and said optimized beamformer weights;
- a reference signal representing sound around said hearing device; and a performance criterion for said minimum processing beamformer.

The hearing device may be configured to provide that the optimized beamformer weights are adaptively determined in dependence of said at least two electric input signals, said reference signal and said performance criterion.

Thereby an improved hearing device, e.g. a hearing aid, may be provided.

The term 'a minimum processing beamformer' is taken to mean a beamformer that provides an output signal (e.g. a filtered signal) that is modified as little as possible (in terms of a selected distance measure; e.g. mean squared error (MSE), e.g. between signal waveforms, or magnitude spectra, etc.) compared to a reference signal, while still fulfilling a performance criterion, e.g. by obtaining at least a minimum level of performance (e.g. defined by a performance measure, such as speech intelligibility or sound quality, etc.). In other words, 'a minimum processing beamformer' may be taken to mean a beamformer that provides an output signal (here 'the filtered signal') at a minimum of modification, defined by a selected distance measure, compared to a reference signal, while still fulfilling a minimum performance criterion, defined by a selected performance measure. The term 'representing sound around the user' is e.g. intended to include 'sound around the hearing device, or sound processed by a (reference) beamformer . . . ' (in other words that the reference signal can be a processed signal). The reference signal may be a beamformed signal, e.g. the result of the at least two electric signals having been filtered by a reference beamformer (defined by reference beamformer weights, cf. e.g. reference beamformer $w_k^R$ quoted in equation (44). The reference signal $s_k^R$ in this example is then given by $s_k^R=(w_k^R)^H x_k$, where $x_k$ represents the at least two electric input signals. In a special embodiment of a beamformed signal, the reference signal may be one of the (unprocessed) at least two electric input signals. In that case the reference beamformer may be exemplified as a beamformer $e_r$ selecting one of the input signals as the reference signal. In that case, the exemplary reference signal $s_k^R$ is given by $s_k^R=e_r^H x_k$.

The hearing device may be configured to provide that the optimized beamformer weights are adaptively determined in dependence of said at least two electric input signals, the reference signal, the selected distance measure, and the performance criterion.

The reference signal may be provided by a beamformer (in one extreme, as one of the (e.g. noisy) electric input signals of the beamformer). The beamformer weights of the reference beamformer may be fixed or adaptively determined (e.g. adaptively determined in dependence of (at least some of) the electric input signals of the reference beamformer).

The reference signal (noisy input, or beamformed version of noisy inputs) is not (e.g. as in a MVDR- or MWF-framework) a clean version of the signal impinging on the reference microphone (which is not accessible in the hearing device). The reference signal may be physically observable.

The optimized beamformer weights may be adaptively determined on a per frequency sub-band level. The optimized beamformer weights $W_m$ to be applied to the $m^{th}$ electric input signal (m=1, . . . , M, where M≥2 is the number of input transducers (and thus electric input signals)) depend on a frequency index, e.g. k (or i for a frequency sub-band representation, cf. FIG. 4B) $W_m(k)$ or $W_m(i)$.

The optimized beamformer weights may be adaptively determined by minimizing a distance between the reference signal and the filtered signal, wherein said distance is estimated by a distance measure. The optimized beamformer weights may be adaptively determined by minimizing a distance (or processing penalty or cost function) between the reference signal and the filtered signal so that the performance criterion is fulfilled. The performance criterion and/or the (minimum) distance measure may, however, be defined in the a full-band domain. A part of the processing to provide the beamformer weights of the minimum processing beamformer may be performed in a full-band domain (one 'sub-band').

The performance criterion may relate to a performance estimator for said minimum processing beamformer being larger than or equal to a minimum value. The optimized beamformer weights may be adaptively determined by minimizing a distance (or processing penalty) between the reference signal and the filtered signal so that the performance estimator for said minimum processing beamformer being larger than or equal to a minimum value. In other words, the optimization problem may be to minimize the distance (or processing penalty) under the constraint that the performance estimator is larger than or equal to a (e.g. predetermined) minimum value. The minimization problem may be solved on a per frequency bin (k) or frequency sub-band level (i).

The distance measure may be based on a squared error between the reference signal and the filtered signal. The distance measure may be based on a metric in a mathematical sense. The distance measure may be a statistical distance measure. The distance measure may be based on the mean squared error (MSE).

The reference signal may be one of the at least two electric input signals. The reference signal may e.g. be a reference input signal from the input transducer chosen as the reference input transducer, e.g. the signal from a front microphone of a BTE-part of a hearing device (the BTE-part being configured to be located at or behind an ear of the user), or an environment facing microphone of an ITE-part of hearing device (the ITE-part being configured to be located at or in an ear canal of the user). In some beamformers, e.g. in an MVDR beamformer, the microphone signals are processed such that the sound impinging from the target direction at a chosen reference microphone is unaltered.

The reference signal is a beamformed signal. The reference signal may e.g. be a beamformed signal provided by an optimal beamformer aiming at maximizing a performance criterion, e.g. a speech intelligibility measure (e.g. SII, or STOI (cf. [Taal et al.; 2011]), or a signal quality measure, e.g. a signal to-noise-ratio, etc. The optimal beamformer may e.g. be an MVDR beamformer. The reference signal may e.g. be the noisy multi-microphone input signal, filtered through a (reference) beamforming system. The (reference) beamforming system could be a fixed beamformer, a noise- or target-adaptive MVDR (Minimum Variance Distortionless response beamformer, a noise- or target-adaptive MWF (Multi-channel Wiener Filter) beamformer, a noise- or target-adaptive LCMV (linearly-constrained minimum variance) beamformer. The reference signal may be the output of a single-microphone noise reduction system. The reference signal may be the output of a deep-learning-based noise reduction system (e.g. comprising a neural network, such as a recurrent neural network).

The performance estimator may comprise an algorithmic speech intelligibility measure or a signal quality measure. The performance estimator may e.g. be or comprise a speech intelligibility measure (e.g. SII, or STOI). The performance estimator may e.g. be or comprise a signal quality measure, e.g. a signal to interference measure (e.g. a signal to-noise-ratio).

The hearing device may comprise a filter bank allowing processing of said at least two electric input signals, or a signal or signals originating therefrom, in the time-frequency domain where said electric input signals are provided in a time frequency representation k, l, where k is said frequency index and l is a time index. The hearing device may comprise a voice activity detector for estimating whether or not (or with what probability) an input signal comprises a voice signal (at a given point in time), e.g. at a frequency bin or frequency sub-band level.

The minimum processing beamformer may be determined as a signal dependent linear combination of at least two beam formers, wherein one of said at least two beamformers is a reference beamformer. In other words, the optimized beamformer weights of the minimum processing beamformer are adaptively determined as a signal dependent linear combination of beamformer weights of the at least two beam formers. The reference signal may be the result of the at least two electric signals having been filtered by the reference beamformer. The minimum processing (MP) beamformer may be written as $BF^{MP}=\alpha BF^1+(1-\alpha)BF^2$, where $BF^{MP}$ is the minimum processing beamformer, $BF^1$ is the reference beamformer, $BF^2$ may be a speech preserving beamformer (e.g. an MVF-beamformer) and $\alpha$ is the signal dependent weight of the linear combination.

The linear combination may comprise a signal dependent weight $\alpha$, which is adaptively updated in dependence of the at least two electric input signals. The signal dependent weight $\alpha$ may be a function of time and frequency.

The signal dependent weight $\alpha$, may be adaptively updated in dependence of said at least two electric input signals, and said reference signal. The signal dependent weight $\alpha$ may be dependent on the performance criterion. The signal dependent weight $\alpha$ may be dependent on a hearing characteristic of the user, e.g. on frequency dependent hearing thresholds, e.g. extracted from an audiogram. The user may be normally hearing or hearing impaired.

The hearing device may be configured to provide a smoothing over time of the signal dependent weight $\alpha$. To avoid abrupt changes of the signal dependent weight $\alpha$ (and, hence, potentially audible processing distortions), a smoothing over time, e.g. recursive averaging across a multitude of the time frames may be performed. The number of time frames may depend on the variability of the at least two electric input signals. The recursive averaging may be performed using a time constant of 20 ms, 50 ms, 100 ms, 500 ms, 1 s, 2 s, 5 s. The number of frames depend on frame length, etc. For reference, a time frame may e.g. comprise $N_s$=64 or 128 audio data samples. A sampling time $t_s$ may e.g. be of the order of 50 μs (1/f for $f_s$=20 kHz) leading to a frame length of 3.2 ms (for $N_s$=64) Other frame lengths may be used depending on the practical application. A time constant of 2 s thus corresponds to around 625 time frames (if non-overlapping), more if overlapping.

The minimum processing beamformer may be composed of a dynamic, signal dependent, linear combination of the reference beamformer and a speech-preserving beamformer. The reference beamformer may comprise a multi-channel Wiener filter (MWF) configured to remove as much noise as possible in the beamformed signal. The speech-preserving beamformer may be multi-channel Wiener filter (MWF) configured to preserve speech (avoid or minimize distortion of speech in noisy environments), e.g. by optimizing signal to noise ratio.

The hearing device may further comprise an output unit configured to provide stimuli perceivable as sound to the user based on said filtered signal or a processed version thereof. The hearing aid may further comprise a signal processor configured to apply one or more processing algorithms to said filtered signal and to provide a processed signal. An input of the signal processor may be connected to the beamformer filter. The hearing device me be or comprise a hearing aid. An output of the signal processor (e.g. providing the processed signal) may be connected to an input of the output unit. The hearing device may comprise a transmitter for transmitting the filtered signal or a further processed version thereof to another device, e.g. to a communication device, such as a telephone. The hearing device may be or comprise a headset.

The hearing device may be constituted by or comprise a hearing aid, e.g. an air-conduction type hearing aid, a bone-conduction type hearing aid, a cochlear implant type hearing aid, or a combination thereof.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may comprise a wireless transmitter for transmitting a processed electric signal to another device, e.g. to a communication device.

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g.

The hearing device may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing device may comprise a digital-to-analogue (DA) converter to convert a digital signal to an analogue output signal, e.g. for being presented to a user via an output transducer.

The hearing device, e.g. the input unit, and or the antenna and transceiver circuitry, may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a rained neural network.

The hearing aid may further comprise other relevant functionality for the application in question, e.g. compression, feedback control, etc.

The hearing device may comprise a hearing aid, e.g. a hearing instrument, e.g. a hearing instrument adapted for being located at the ear or fully or partially in the ear canal of a user. The hearing device may comprise a headset, an earphone, an ear protection device or a combination thereof.

Use:

In an aspect, use of a hearing aid as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device, e.g. a hearing aid, adapted for being worn at or in an ear of a user, is provided. The method may comprise providing at least two electric input signals representing sound around said hearing device;

providing optimized beamformer weights of a minimum processing beamformer, which when applied to said at least two electric input signals provide a filtered signal;

providing a reference signal representing sound around said hearing device;

providing a performance criterion for said minimum processing beamformer.

The method may further comprise adaptively determining said optimized beamformer weights in dependence of said at least two electric input signals, said reference signal and said performance criterion.

In an aspect method of operating a hearing device adapted for being worn at or in an ear of a user is provided. The method comprises providing at least two electric input signals representing sound around said hearing device;

providing optimized beamformer weights of a minimum processing beamformer, which when applied to said at least two electric input signals provide a filtered signal;

providing a reference signal representing sound around said hearing device;

providing a performance criterion for said minimum processing beamformer.

The minimum processing beamformer may be a beamformer that provides the filtered signal with as little modification as possible in terms of a selected distance measure compared to said reference signal, while still fulfilling said performance criterion.

The method may further comprise adaptively determining said optimized beamformer weights in dependence of said at least two electric input signals, said reference signal, said distance measure, and said performance criterion.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method of operating a hearing device may e.g. comprise the steps of

Providing an estimate of whether or not the least two electric input signals comprise speech in a given time-frequency unit;

Providing signal statistics based on said at least two electric input signals, e.g. covariance matrices, acoustic transfer functions, etc.;

Providing a reference beamformer and a further (e.g. speech preserving) beamformer;

Calculating beamformer weights of the reference beamformer and the further beamformer;

Adaptively determining a weighting coefficient for a linear combination of said reference beamformer and said further beamformer in dependence of said at least two electric input signals, said reference signal, said distance measure, and said performance criterion, thereby determining said optimized beamformer weights.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The user interface may be implemented in an auxiliary device, e.g. a remote control, e.g. implemented as an APP in a smartphone or other portable (or stationary) electronic device. The user interface may implement a Minimum Processing APP For configuration of a minimum processing beamformer according to the present disclosure. The user interface (and the auxiliary device and the hearing device) may be configured to allow a user to select a reference signal and performance criterion for use in determining optimized beamformer weights for a minimum processing beamformer according to the present disclosure. The auxiliary device and the hearing device are configured to allow a user to configure the minimum processing beamformer according to the present disclosure via the user interface. Some of the (possibly optional) parameters of the procedure for estimating beamformer weights for a minimum processing beamformer according to the present disclosure may be stored in memory of the hearing device (or the auxiliary device), e.g. details of the performance criteria, e.g. minimum values of different speech intelligibility measures (e.g. SII, STOI, etc.).

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
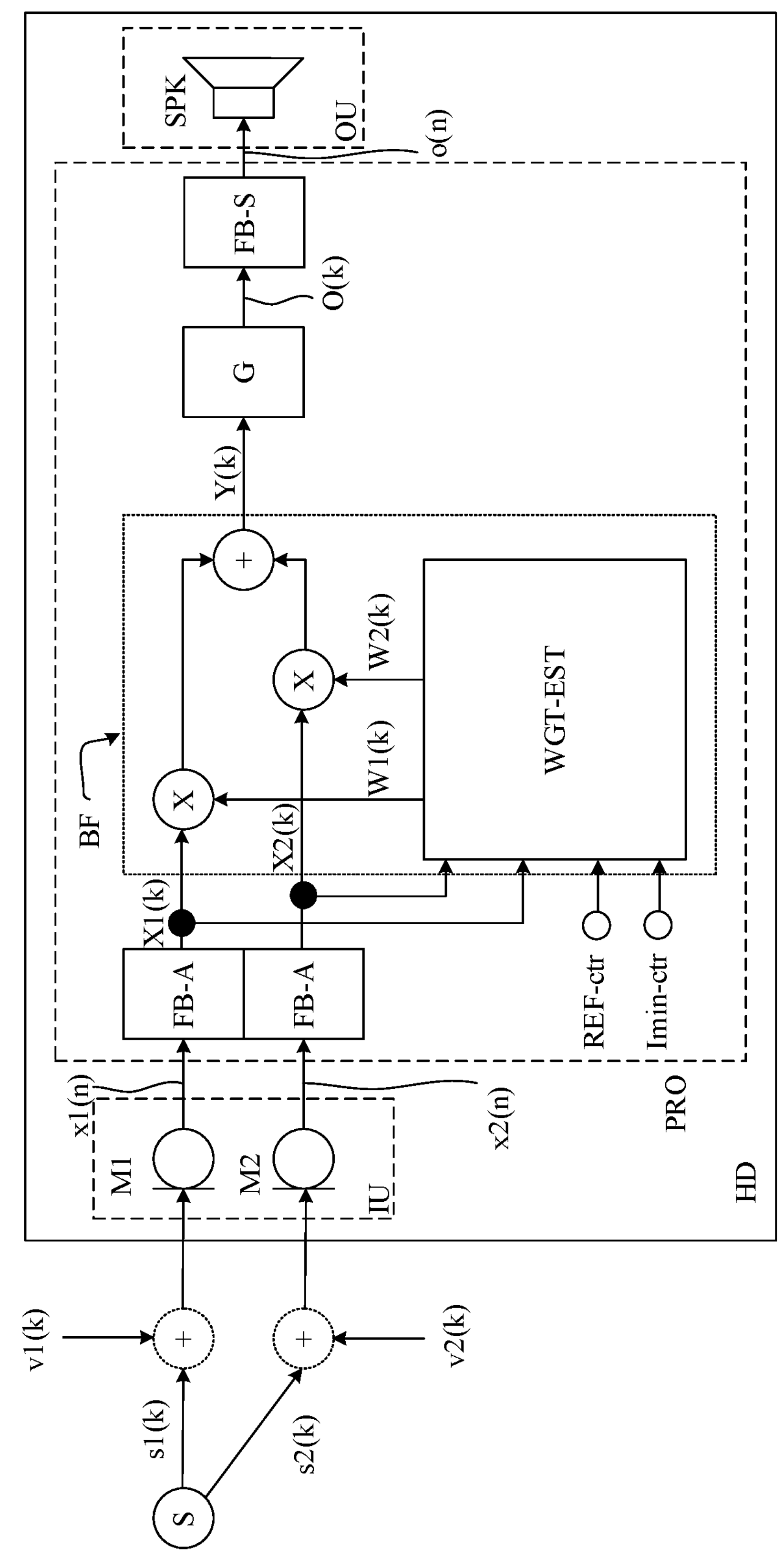
FIG. 1A shows a schematic block diagram of a first embodiment of a hearing device according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. The present application relates to hearing aids, in particular to noise reduction in hearing aids.

A. Notation and Signal Model

In the following matrices and vectors are denoted by boldface uppercase and lowercase letters, respectively. Covariance matrices are denoted by the letter C followed by an appropriate subscript as for example in $C_{x_k}$ for the random vector $x_k$. Similarly, variances of random variables are denoted by the symbol $\sigma^2$ with an appropriate subscript. Sets and functionals are denoted by Blackboard Bold and Calligraphic symbols, respectively, as in A and $\mathcal{J}$. The M×M identity matrix is denoted by IM, and $e_r$ denotes a vector which is zero everywhere except for its $r^{th}$ component, which is unity. The superscript $^H$ is used to denote the Hermitian transpose. For complex conjugate of scalars, the superscript * is used (not to be confused with the superscript *, which is used to mark the solutions to optimization problems). The statistical expectation operation is denoted by E[•].

In the present disclosure, speech and noise signals are represented in the time-frequency domain. A frequency bin index k and a time frame index l are thus needed to address a certain time-frequency tile. In most of the expressions and formula of the present disclosure, the time frame index l has been dispensed with, however, to avoid confusing notation. It is therefore assumed by default, that we are considering a certain time frame l, unless otherwise is expressly stated.

Denoting the number of microphones by M, without loss of generality, microphone r, 1≤r≤M, is arbitrarily selected as the reference microphone. Suppose that K={1, . . . , K} is the set of all frequency bin indices. Stacking the signals acquired by all the microphones in one vector $\tilde{x}_k \in \mathbb{C}^M$ for frequency bin k, the following speech in noise model is used:

$$\tilde{x}_k = \tilde{s}_k d_k + \tilde{v}_k \tag{1}$$

where all the variables are in general complex-valued. The M-dimensional random vectors $\tilde{v}_k$ and $\tilde{x}_k$ respectively represent the noise and noisy signals collected by the M microphones, and the random variable $\tilde{s}_k$ denotes the clean speech signal at the reference microphone. The M-dimensional vector $d_k$ represents the relative transfer function for the M microphones (with respect to the reference microphone), and its $r^{th}$ component is therefore unity. We thus have $e_r^H d_k = 1$.

In some applications of beamforming, e.g. in some hearing assistive devices (e.g. hearing aids), the signal needs to be amplified or attenuated depending on the application. This means that the speech to be delivered to the listener's ear will be subject to an insertion gain $g_k$. Therefore, in ideal conditions, the clean speech at the output of the device is given by:

$$s_k = g_k \tilde{s}_k \tag{2}$$

Obviously $g_k=1$, when no gain is applied. Corresponding to equation (2), we define $x_k \triangleq g_k \tilde{x}_k$ and $v_k \triangleq g_k \tilde{v}_k$. Therefore, without any change in the form, equation (1) can be rewritten as:

$$x_k = s_k d_k + v_k \tag{3}$$

As common practice in the speech processing literature, we assume independence across the frequency bins, which is approximately valid, when the correlation time of the signals involved is short compared to the time-frequency analysis window size. Moreover, we assume that speech and noise signals are uncorrelated and zero-mean. Combining these assumptions, the covariance matrix $C_{x_k}$ of $x_k$ is given by:

$$C_{x_k} = C_{s_k} + C_{v_k} = \sigma_{s_k}^2 d_k d_k^H + C_{v_k} \tag{4}$$

More generally, we define $C_{s_k}^{(\mu)}$ as:

$$C_{s_k}^{(\mu)} = C_{s_k} + \mu C_{v_k} \tag{5}$$

where μ is a real-valued non-negative constant. The physical meaning of different value ranges of μ are discussed further below (after equation (13)). We call $C_{s_k}^{(\mu)}$ the generalized covariance matrix of $x_k$.

Throughout the present disclosure, the common assumption that $C_{v_k}$ is invertible is made. Consequently, we exclude the rare case, where noise is only composed of less than M point sources. In practice, even in this case, the microphones add small uncorrelated noise terms, that ensure a full-rank covariance matrix. In addition to $C_{v_k}$, $\sigma_{v_k}^2$, which is the variance of the noise component $v_k$ at the reference microphone will be referred to.

The proposed concept heavily relies on perceptually driven performance criteria, e.g. intelligibility or quality predictors.

The most well-known examples of these predictors, such as PESQ, STOI and ESTOI, HASPI and HASQI, and SII and ESII are defined in sub-bands that are deliberately defined for compliance with the human perception of sound. Critical bands, octave bands, and fractional octave bands are a few examples. On the other hand, beamformers are typically derived and analysed in the time-frequency domain using easy-to-invert time-frequency transformations such as the short-time Fourier transform (STFT).

For the sake of generality, we make a distinction between the two: For the perceptually driven sub-band divisions in which a certain performance criterion is defined, we use the term sub-band, while for the time-frequency tiles where the beamformer weight vector is derived/applied, we use the term frequency bin. The case where the two are chosen to be the same is a special case of this general framework. Depending on how the sub-bands and frequency bins are defined, there may be multiple frequency bins contributing to the same sub-band and/or multiple sub-bands contributing to the same frequency bin, each with certain weights. Throughout this application, we use i to index sub-bands, and k to index frequency bins.

Suppose that we have n sub-bands, and $B_i$ for i=1, . . . , n, is the set of all frequency bins k that contribute to sub-band i. As an example of how we use the correspondence between the sub-bands and frequency bins, the clean speech spectrum level for sub-band i is defined as:

$$P_{S_i} \triangleq \frac{1}{\beta_i}\sum_{k\in B_i}\omega_{i,k}\sigma_{S_k}^2 \tag{6}$$

where $\beta_i$ is the bandwidth for sub-band i, and $\omega_{i,k}$ is a weight that specifies the contribution of frequency bin k to sub-band i (cf. Appendix A in [Zahedi et al.; 2021] for more details).

FIG. 1A shows a simple diagram of a linear beamformer with the above introduced signal model for the special case of M=2 microphones. Denoting the beamformer weight vector at frequency bin k by $w_k$, the output of the beamformer is given by:

$$y_k=w_k^H x_k \tag{7}$$

Figure 1B:
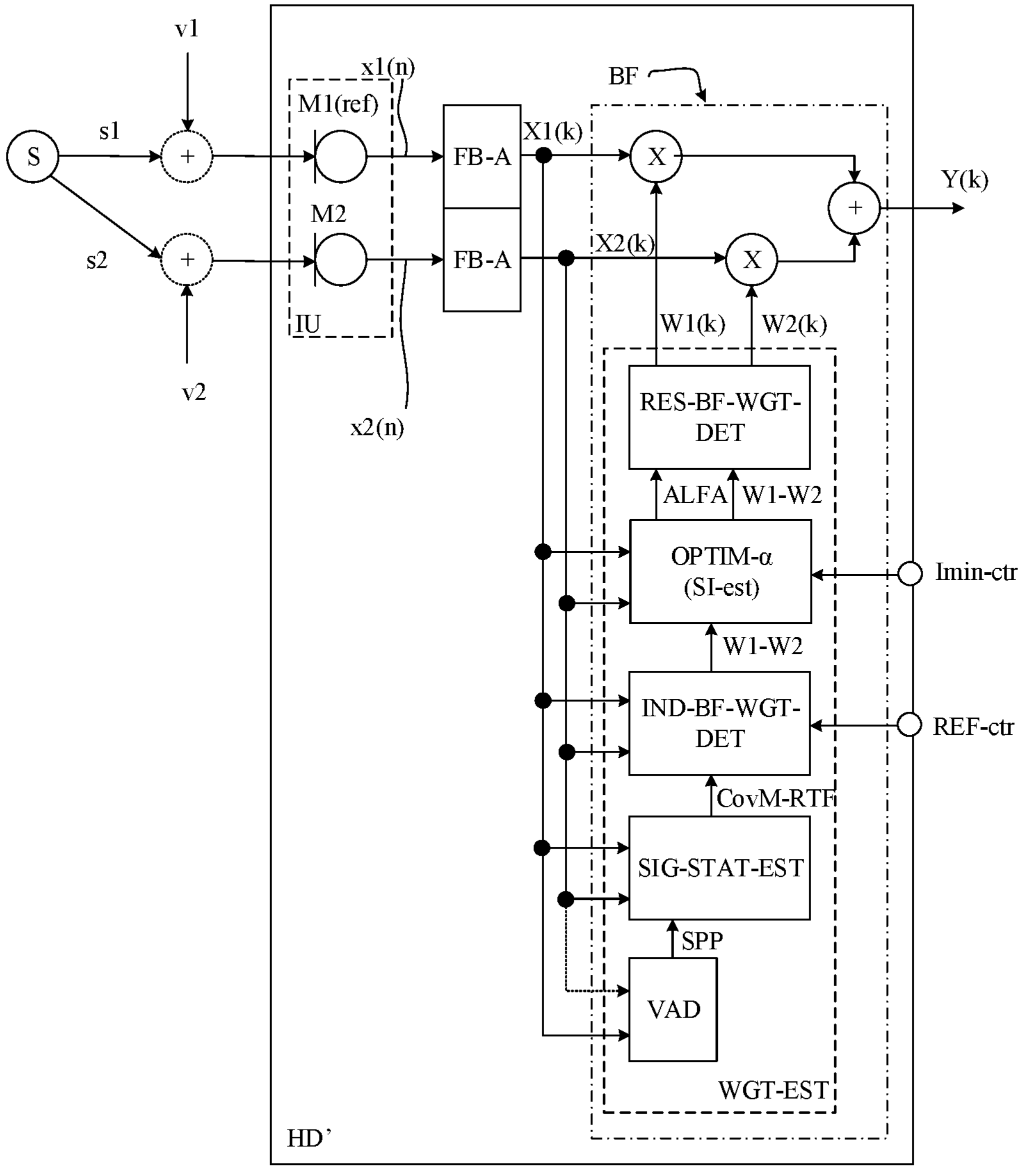
FIG. 1B shows, a schematic block diagram of a second embodiment of a hearing device according to the present disclosure, FIG. 2 schematically shows postfilter gain $g_k^{(\mu)}$ as a function of the SNR $\xi_k$ for the μMWF beamformer with three different values of μ.

The purpose of the weight estimator WGT-EST in FIG. 1A, 1B is to determine beamformer weights (W1(*k*) and W2(*k*)) to minimize D(REF,Y), while I(Y)≥Imin, where REF is the reference signal, Imin is the minimum acceptable value of the performance estimator, Y is the minimum processing beamform signal, and D is the distance measure (or processing penalty).

B. Multi-Channel Wiener Filter

The standard form of MWF results from solving a minimum MSE problem which minimizes the following cost function:

$$\mathcal{MS}\varepsilon(s_k,y_k)=E[|s_k-y_k|^2] \tag{8}$$

$$\mathcal{MS}\varepsilon(s_k,y_k)=e_r-w_k)^H C_{s_k}(e_r-w_k)+w_k^H C_{v_k}w_k \tag{9}$$

where equation (9) follows from equation (7) and the assumption that speech and noise are uncorrelated. The solution is given by:

$$w_k^{MVF}=C_{x_k}^{-1}C_{s_k}e_r \tag{10}$$

The first term on the right-hand side of (9) formulates the distortion introduced to the clean speech due to the enhancement, and the second term is the residual noise power. As seen in equation (9), the MSE criterion equally penalizes speech distortion and residual noise. A natural generalization of this cost function is to allow for different weights for these two terms. As previously proposed, one such generalization is to use $$\mathcal{MS}\varepsilon_\mu(s_k,y_k)\triangleq(e_r-w_k)^H C_{s_k}(e_r-w_k)+\mu w_k^H C_{v_k}w_k \tag{11}$$

with μ being a non-negative constant, resulting in the following generalized MWF:

$$w_k^{\mu MVF}=(C_{x_k}^{(\mu)})^{-1}C_{s_k}e_r \tag{12}$$

Figure 2:
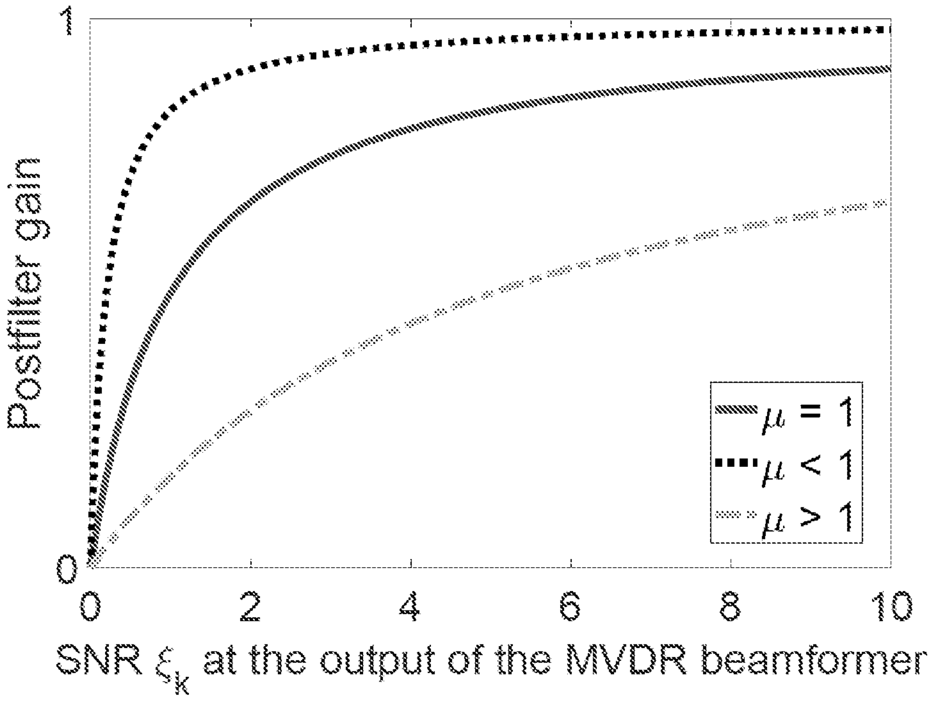

It is well-known that MWF can be restated as a cascade of the MVDR beamformer and a Wiener postfilter. It can be shown (cf. e.g. Appendix B in [Zahedi et al.; 2021]), that the μMWF beamformer in equation (12) can similarly be restated as the cascade of the MVDR beamformer and the following generalized Wiener postfilter:

$$g_k^{(\mu)}=\frac{\xi_k}{\mu+\xi_k} \tag{13}$$

where $\xi_k \triangleq \sigma_{s_k}^2 d_k^H C_{v_k}^{-1} d_k$ is the SNR at the output of the MVDR beamformer. FIG. 2 shows the plot of $g_k^{(\mu)}$ as a function of $\xi_k$ for μ=1, μ<1 and μ>1. For μ=1, it reduces to the well-known single-channel Wiener filter (SWF), leading to a beamformer that is optimal in MSE sense. For μ<1, the postfilter incurs a lower level of speech distortion compared to the standard Wiener filter at the cost of higher residual noise. In the limit when, μ→0, the μMWF beamformer reduces to the MVDR beamformer. On the contrary, μ>1 leads to an aggressive postfilter that suppresses more noise compared to the standard SWF at the cost of higher levels of speech distortion.

All the beamformers introduced so far are formulated with the aim of reconstructing the clean speech, i.e. complete suppression of noise as an ideal. It has been suggested that one may be interested in preserving a fraction of the noise in addition to the target speech, for instance to better preserve the spatial characteristics of noise in addition to the target speech. For that purpose, one can minimize $\mathcal{MS}\varepsilon(s_k+\alpha v_k,y_k)$=for a given positive constant α, which leads to the following solution:

$$w_k^{MVF\text{-}N}=w_k^{MVF}+\alpha e_r \tag{14}$$

In effect, the MWF-N beamformer takes the output of an MWF beamformer and adds a fraction of the unprocessed noisy speech from the reference microphone to it.

Finally, one can combine the μMWF and MWF-N beamformers to obtain the following generalized beamformer (see e.g. [Van den Bogaert et al, 2009]):

$$w_k^{\mu MVF\text{-}N}=w_k^{\mu MVF}+\alpha e_r \tag{15}$$

This is especially useful when a large value of μ is chosen for the μMWF part; i.e. an aggressive beamformer with a high level of speech distortion. In this case, the resulting distortion of the clean speech can be partially compensated for by adding a fraction of the unprocessed signal to the output of the μMWF beamformer. The μMWF-N beamformer in equation (15) is the most general of the above-mentioned beamformers. All the other beamformers can be seen as special cases of equation (15) for certain choices of the parameters μ and α.

Minimum Processing Beamforming

A. Proposed Concept:

Suppose that $s_k^R$ is a given reference signal (not to be confused with the clean speech at the reference microphone). Consider a certain sub-band i. We stack all $s_k^R$ for k ∈ $B_i$ in a vector denoted by $s_i^R$. Similarly, we stack all $y_k$, $s_k$ and $v_k$ for k ∈ into vectors $y_i$, $s_i$ and $v_i$, respectively. Also, consider the two finite non-negative functionals D(;) and (ï). We define the minimum-processing beamformer in sub-band i as the solution to the following optimization problem:

$$\min_{w_k,k\in B_i} D(s_i^R,\cdot y_i)\ \text{s.t.}\ I(y_i,\cdot s_i)\geq I_i' \tag{16}$$

where $D(s_i^R,\cdot y_i)$ measures the distance (processing penalty) between the reference signal and the beamformer output, $I(y_i,\cdot s_i)$ is an estimator of performance for the beamformer output in sub-band i in a certain sense, e.g. speech intelligibility, sound quality, etc. The term $I_i'$ in (16) is defined as:

$$I_i' \triangleq \min(I_i, I_i^{max}) \tag{17}$$

where $I_i$ is a given minimum requirement on the beamformer performance $I(y_i,\cdot s_i)$, and $I_i^{max}$ is the maximum achievable performance which is obtained when the processing penalty $D(s_i^R,\cdot y_i)$ is disregarded, and the performance $I(y_i,\cdot s_i)$ is maximized in an unconstrained manner.

In equation (16), dependency of $I(y_i,\cdot s_i)$ on the clean speech $s_i$ is implied by the notation for generality. In many practical situations, performance is estimated from the beamformer output alone, and we have $I(y_i,\cdot s_i)=I(y_i)$.

A special case of equation (16), where $s_i^R=s_i+\alpha v_i$, the processing penalty D is chosen to be the $\mathcal{MS}\varepsilon_\mu$ defined in equation (11), and the constraint is annihilated by setting $I_i=0$, leads to the generalized μMWF-N beamformer in equation (15). This demonstrates the generality of the formulation in equation (16). In present disclosure, a case study, where the processing penalty $\mathcal{D}$ is similar to the $\mathcal{MS}\varepsilon_\mu$ criterion, and the performance criterion $I(\cdot;\cdot)$ is an intelligibility estimator based on the SII [ANSI S3.22-1997], is outlined. The problem may be solved analytically for any given reference signal $S_k^R$.

In the following two special cases are exemplified, an 'ambient preserving mode' and an 'aggressive mode'.

Ambient-Preserving Mode:

In this mode of operation, the unprocessed signal from the reference microphone $e_r^H x_k$ is chosen as the reference signal $s_k^R$. This leads to a beamformer that attempts to retain as much of the clean speech and noise as possible by keeping the processing of the noisy speech to the minimum amount necessary for achieving the given intelligibility requirement.

Aggressive Mode:

In this mode, the reference signal $s_k^R$ is the output of a reference beamformer $w_k^R$. This leads to a beamformer that inherits the (presumably desirable) properties of the reference beamformer, except for the situations, where this violates the intelligibility requirement. In particular, we study the case where the reference beamformer is the aggressive form of the MWF beamformer.

B. Motivation

Existing research (as well as our experience) show that directional hearing aids in some situations tend to over-suppress the natural ambient noise, leaving the users with a feeling of isolation or exclusion. While not downplaying the crucial role of sufficient speech intelligibility, it seems reasonable that if any suppression of the ambient noise takes place, it should be limited to the minimum necessary amount that precludes any compromise of speech intelligibility. This can be formulated by setting the reference signal in equation (16) equal to the unprocessed signal at the reference microphone, and choosing a speech intelligibility estimator as the performance criterion $I(\cdot;\cdot)$. In other words, we apply a minimum processing principle to modify the noisy signal as little as possible in order to obtain a desired level of intelligibility. This was indeed the initial motivation for this work of the present disclosure. The concept has been generalized, however, from using the noisy signal at the reference microphone to any given reference signal as in equation (16). An example of special interest is when the reference signal is the output of a certain beamformer $w_k^R$. This can be useful when the reference beamformer $w_k^R$, within a certain context or for a certain application, has particularly desirable properties that are compromised by pronounced drawbacks. As an example, the μMWF beamformer in equation (12) with aggressive noise suppression properties (μ>>1) can effectively suppress noise at the cost of distorting speech. By choosing it as the reference beamformer in equation (16), while opting for a speech preserving performance criterion we obtain a beamformer that does an outstanding job of suppressing the noise, whenever it would not harm the speech to more than a certain extent.

Theory

Processing Penalty

A starting point for defining the processing penalty $\mathcal{D}(\cdot;\cdot)$ may e.g. be the MSE criterion. Writing it in sub-bands rather than frequency bins for the sake of compatibility with the formulation in equation (16), it takes the following form:

$$\hat{D}(s_i^R,\cdot y_i) = \frac{1}{\beta_i}\sum_{k\in B_i}\omega_{i,k}E\left[|s_k^R - y_k|^2\right] \tag{18}$$

Vectors $r_k$ and $u_k$ are defined:

$$r_k \triangleq E[x_k(s_k^R)^*] \tag{19}$$

$$u_k \triangleq C_{x_k}^{-1} r_k \tag{20}$$

Expanding the terms in equation (18) and subtracting and adding $r_k^H C_{x_k}^{-1} r_k$ on the right side, we obtain:

$$D(s_i^R,\cdot y_i) = \frac{1}{\beta_i}\sum_{k\in B_i}\omega_{i,k}\left(\sigma_{s_k^R}^2 - r_k^H C_{x_k}^{-1} r_k\right) + \frac{1}{\beta_i}\sum_{k\in B_i}\omega_{i,k}(w_k - u_k)^H C_{x_k}(w_k - u_k) \tag{21}$$

The first term on the right-hand side of equation (21) is independent of the weight vectors $w_k$. It thus has no impact on the solution to the optimization problem of equation (16). Discarding this term, and substituting $C_{x_k}$ with $C_{x_k}^{(\mu)}$ in equation (21) for more generality, the final form of the processing penalty is obtained as follows:

$$D(s_i^R,\cdot y_i) = \frac{1}{\beta_i}\sum_{k\in B_i}\omega_{i,k}(w_k - u_k)^H C_{x_k}^{(\mu)}(w_k - u_k) \tag{22}$$

Exemplary Performance Criterion:

In the following example, an estimation of speech intelligibility based on the SII is used as the performance criterion. It is evaluated on a per-frame basis. Assuming normal vocal effort and thus no speech level distortion, the SII is given by a weighted sum of the so-called band audibility functions over all the sub-bands [ANSI S3.22-1997]. Since equation (16) is defined for a certain sub-band, we define a band audibility constraint for each sub-band instead of setting one single intelligibility constraint for the entire signal. Moreover, we disregard spectral masking effects to avoid unnecessary complications, as our experience suggests that for most cases of practical interest, it has an insignificant effect on the resulting score.

With $\zeta_i$ being the speech to disturbance ratio for sub-band i, the audibility function $\Psi(\zeta_i)$ for sub-band i is given by the following function:

$$\Psi(\zeta_i) = \begin{cases} 0, \text{ if } (10 \log \zeta_i) < -15 \\ 1, \text{ if } (10 \log \zeta_i) > +15 \\ \dfrac{10 \log \zeta_i + 15}{30}, \text{ otherwise} \end{cases} \quad (23)$$

Figure 3:
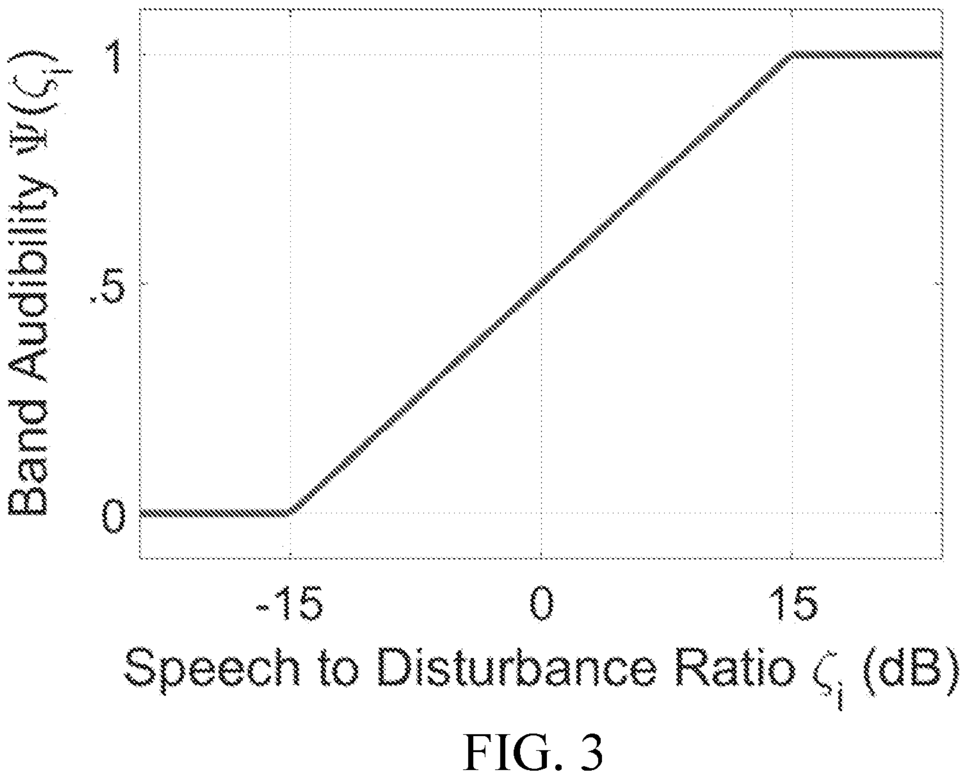
FIG. 3 shows ANSI recommendation for the relationship between band audibility and speech-to-disturbance ratio (cf. [ANSI-53-22-1997]), FIG. 4A schematically illustrates a time variant analogue signal (Amplitude vs time) and its digitization in samples, the samples being arranged in a number of time frames, each comprising a number $N_s$ of samples, and FIG. 4B schematically illustrates a time-frequency representation of the time variant electric signal of FIG. 4A.

This function is plotted in FIG. 3. With the performance estimator chosen to be $I(y_i, \cdot s_i)=\Psi(\zeta_i)$, the performance criterion in equation (16) is given by:

$$\Psi(\zeta_i) \geq I_i' \quad (24)$$

To calculate $\zeta_i$, we first obtain the total error power in sub-band i at the output of beamformers $w_k$; for $k \in \mathbb{B}$. This is calculated, in a manner similar to equation (11), as the sum of the speech distortion and noise power:

$$N_i = \frac{1}{\beta_i} \sum_{k \in B_i} \omega_{i,k} (e_r - w_k)^H C_{s_k} (e_r - w_k) + \mu \omega_{i,k} w_k^H C_{v_k} w_k \quad (25)$$

where normalization by bandwidth $\beta_i$ is in accordance with the ANSI standard [ANSI S3.22-1997]. Let $\Lambda_i$ denote the equivalent internal noise level (cf. [ANSI S3.22-1997]) for sub-band i, modelling the threshold of hearing. For normal-hearing listeners, $\Lambda_i$ follows from the threshold of hearing in quiet for the average normal hearing person. For the hearing-impaired, the threshold must be elevated based on the individual's pure-tone audiogram. Using $N_i$ and $\Lambda_i$, the equivalent disturbance spectrum for sub-band i is calculated as (cf. [ANSI S3.22-1997]):

$$D_i = \max(\Lambda_i, N_i) \quad (26)$$

Finally, we calculate the speech to disturbance ratio using the following formula:

$$\zeta_i = \frac{P'_{s_i}}{D_i} \quad (27)$$

Where $P_{s_i}'$ is defined as $$P_{s_i}' \triangleq P_{s_i} - \Delta_i \quad (28)$$

with $P_{s_i}$ given in equation (6), and $\Lambda_i$ modelling a possible loss of the clean speech power at the output of the beamformer. This is further dealt with in section V-B of [Zahedi et al.; 2021].

The fact that the threshold of hearing $\Lambda_i$, as well as the insertion gain $g_k$ (cf. equations (26) and (2), respectively) are taken into account, makes the present framework suitable for hearing-impaired as well as normal-hearing users.

Problem Formulation and Solution

Combining the results outlined above, the optimization problem set up in equation (16) can be written as follows:

$$\min_{w_k, k \in B_i} \frac{1}{\beta_i} \sum_{k \in B_i} \omega_{i,k} (w_k - u_k)^H C_{x_k}^{(\mu)} (w_k - u_k) \quad (29)$$

$$\text{s.t.} \begin{cases} \max(\Lambda_i, N_i) \leq P'_{s_i} 10^{-3\left(I_i' - \frac{1}{2}\right)}, \\ P_{s_i} 10^{-\frac{3}{2}} \leq \max(\Lambda_i, N_i) \leq P'_{s_i} 10^{\frac{3}{2}}, \end{cases}$$

where the first constraint reflects the third condition in equation (23), and the second constraint is corresponding to the first two boundary conditions in equation (23). Before presenting the solution, we first need to make a number of definitions. In particular, we define the two parameters $N_i^R$ and $h_i$ as follows:

$$N_i^R \triangleq \frac{1}{\beta_i} \sum_{k \in B_i} \omega_{i,k} (e_r - u_k)^H C_{s_k} (e_r - u_k) + \mu \omega_{i,k} u_k^H C_{v_k} u_k \quad (30)$$

$$h_i \triangleq \frac{1}{\beta_i} \sum_{k \in B_i} \omega_{i,k} \left(u_k - w_k^{\mu MVF}\right)^H C_{x_k}^{(\mu)} \left(u_k^R - w_k^{\mu MVF}\right) \quad (31)$$

As shown in [Zahedi et al.; 2021], these parameters can be interpreted depending on the choice of the reference signal. In addition, the two constants $I_i^{min}$ and $I_i^{max}$ are defined as follows (details can be found in Appendix C of [Zahedi et al.; 2021]):

$$I_i^{min} \triangleq \min\left(1, \frac{1}{2} + \frac{1}{3} \max\left(-\frac{3}{2}, \log \frac{P'_{s_i}}{\max(N_i^R, \Lambda_i)}\right)\right) \quad (32)$$

$$I_i^{max} \triangleq \min\left(1, \frac{1}{2} + \frac{1}{3} \max\left(-\frac{3}{2}, \log \frac{P'_{s_i}}{\max(N_i^R - h_i, \Lambda_i)}\right)\right) \quad (33)$$

Finally, the constant $\alpha_i^{min}$ is defined:

$$\alpha_i^{min} \triangleq \sqrt{\max\left(0, 1 - \frac{N_i^R - \Lambda_i}{h_i}\right)} \quad (34)$$

From the above, following results can consequently be deduced (cf. e.g. [Zahedi et al.; 2021]):

1) The minimum processing beamformer; i.e. the solution $w_{k,i}^{MP}$ to (29) is given by:

$$w_{k,i}^{MP} = \alpha_i u_k + (1 - \alpha_i) w_k^{\mu MVF} \quad (35)$$

where $\alpha_i$ (henceforth called the combination weights) are calculated as follows: If $N_i^R \leq \Lambda_i$, then $\alpha_i = 1$; otherwise:

$$\alpha_i = \begin{cases} \alpha_i^{min}, \text{ if } I_i \geq I_i^{max} \\ 1, \text{ if } I_i \leq I_i^{min} \\ \sqrt{\max\left(0, 1 - \max\left(0, \dfrac{N_i^R - P'_{s_i} 10^{-3\left(I_i - \frac{1}{2}\right)}}{h_i}\right)\right)}, \text{ otherwise} \end{cases} \quad (36)$$

2) Maximum performance (in terms of band audibility), which is obtained by disregarding the processing penalty $D(s_i^R, \cdot y_i)$ and maximizing $I(y_i, s_i)=\Psi(\zeta_i)$, is given by equation (33).

3) Minimum performance, which is obtained by disregarding the performance constraint $\Psi(\zeta_i) \geq I_i'$ and minimizing the processing penalty $D(s_i^R, \cdot y_i)$, $y_1$), is given by equation (32).

Depending on the type of correspondence considered between the frequency bins and sub-bands, there can be overlap between the sub-bands; i.e., a single frequency bin can contribute to more than one sub-band. For that reason, we have assumed dependency both on the frequency bin index k and the sub-band index i in the beamformer weight vector $w_{k,i}^{MP}$. Let $F_k$ denote the set of all sub-bands to which the frequency bin k contributes, and $\eta_{i,k}$ be the weight that accounts for the impact of this contribution on the beamformer weight vector. The beamformer weight vector at frequency bin k is given by:

$$w_k^{MP}=\Sigma_{i\in F_k}\eta_{i,k}w_{k,i}^{MP} \quad (37)$$

In Appendix A of [Zahedi et al.; 2021], we provide more details on the calculation of $\eta_{i,k}$ and other considerations related to the correspondence between the sub-bands and frequency bins.

Reference Signal

In the examples of the present disclosure, we confine ourselves to two choices of the reference signal with two different goals in mind. Obviously, for any other relevant scenario, one has to define the reference signal that suits the application.

1. Ambient Noise Preserving Mode:

In applications, such as hearing assistive devices, when sounds other than the target speech potentially convey useful information (e.g. traffic noise alarms, etc.) or are of interest (e.g. background music), it is desirable to preserve them fully or in part, with the criterion being an uncompromised level of intelligibility for the target speech. Setting the reference signal $s_k^R$ equal to the unprocessed signal from the reference microphone $e_r^H x_k$ allows for this mode of operation. Substituting in equation (19) and the result in equation (20), we obtain:

$$u_k=e_r \quad (38)$$

Following equation (35), we thus have:

$$w_{k,i}^{MP}=\alpha_i e_r+(1-\alpha_i)w_k^{\mu MVF} \quad (39)$$

This beamformer is similar to equation (15), with the important difference that here the coefficient $\alpha_i$ is signal dependent. More particularly, $\alpha_i$ adapts to the situation depending on how noisy the speech is in the given time frame and sub-band, cf. equation (36).

Substituting equations (38) and (39) in (30), we have:

$$N_i^R=\frac{1}{\beta_i}\sum_{k\in B_i}\omega_{i,k}\left(\mu\sigma_{v_k}^2\right) \quad (40)$$

In other words, NR is the noise power in sub-band i. Similarly, substituting equations (38) and (39) in (31), and using equation (12), we obtain:

$$h_i=\frac{1}{\beta_i}\sum_{k\in B_i}\omega_{i,k}e_r^H\left(\mu C_{v_k}\right)^H\left(C_{x_k}^{(\mu)}\right)^{-1}+\left(\mu C_{v_k}\right)e_r \quad (41)$$

Using equation (5), applying the Sherman-Morrison formula, and simplifying the result, equation (41) reduces to the following:

$$h_i=N_i^R-\frac{1}{\beta_i}\sum_{k\in B_i}\omega_{i,k}\mu\sigma_{o,v_k}^2 g_k^{(\mu)} \quad (42)$$

where $g_k^{(\mu)}$ is the generalized Wiener postfilter given by equation (13), and $\sigma_{o,v_k}^2 \triangleq d_k^H C_{v_k}^{-1} d_k$ is the noise variance at the output of the MVDR beamformer.

2. Aggressive Mode:

This mode of operation is suitable for circumstances, where maximum suppression of noise is desired, without severely damaging the target speech. The reference signal is chosen to be the output of a reference beamformer $w_k^R$. We thus have $s_k^R=(w_k^R)^H x_k$. Substituting in equation (19) and the result in equation (20), we obtain:

$$u_k=w_k^R \quad (43)$$

Consequently, equation (35) takes the following form:

$$w_{k,i}^{MP}=\alpha_i w_k^R+(w_k^{\mu MVF} \quad (44)$$

One viable choice of the reference beamformer is the μMWF beamformer (12) with μ>>1. This beamformer can do an outstanding job of suppressing the noise, but at the same time, it significantly distorts the target speech. In time frames and sub-bands where the SNR is not particularly high, these distortions will be very severe, giving rise to an overall output speech that is more audibly distorted than desired. We attempt to obtain a performance as close as possible to the μMWF beamformer (with μ>>1) in terms of noise suppression by choosing it as the reference beamformer. On the other hand, for the second term on the right-hand side of equation (44), we set μ<<1 to obtain a speech-preserving beamformer that precludes excessive distortions of speech in unfavourable conditions. This yields:

$$w_{k,i}^{MP}=\alpha_i w_k^{\mu 1MVF}+(1-\alpha_i)w_k^{\mu 2MVH} \quad (45)$$

Where $\mu_1>>1$ and $\mu_2<<1$.

Next, we calculate $N_i^R$ and $h_i$ for the present case. Substituting equation (43) in (30) yields:

$$N_i^R \triangleq \frac{1}{\beta_i}\sum_{k\in B_i}\omega_{i,k}\left(e_r-w_k^R\right)^H C_{s_k}\left(e_r-w_k^R\right)+\mu\omega_{i,k}\left(w_k^R\right)^H C_{v_k}w_k^R \quad (46)$$

$$N_i^R=N_{s,i}^R+\mu N_{v,i}^R$$

It thus becomes clear that $N_i^R$ is the total error at the output of the reference beamformer in sub-band i, and can be written as the sum of the noise power $\mu N_{v,i}^R$ and speech distortion $N_{s,i}^R$ at the output of the reference beamformer. To calculate $h_i$ using (31), we rewrite the two μMWF beamformers in (45) as the series of the MVDR beamformer and a generalized Wiener postfilter to obtain:

$$h_i=\frac{1}{\beta_i}\sum_{k\in B_i}\omega_{i,k}\left(g_k^{(\mu_1)}-g_k^{(\mu_2)}\right)^2\left(w_k^{MVDR}\right)^H C_{x_k}^{(\mu_2)}w_k^{MVDR} \quad (47)$$

$$h_i=\frac{1}{\beta_i}\sum_{k\in B_i}\omega_{i,k}\left(g_k^{(\mu_1)}-g_k^{(\mu_2)}\right)^2\left(\sigma_{s_k}^2+\mu_2\sigma_{o,v_k}^2\right)$$

where (47) follows from $C_{x_k}^{(\mu_2)}=\sigma_{s_k}^2 d_k d_k^H+\mu_2 C_{v_k}$ and $w_k^{MVDR}=C_{v_k}^{-1}d_k/\sigma_{o,v_k}^2$

Practical Considerations

There are practical matters that are crucial for optimal operation of the proposed beamformers in real-life scenarios. In this section, we address these considerations.

Time Averaging for Combination Weights

The value of $\alpha_i$ given by equation (36) can change abruptly across the time frames, leading to audible distortions of the speech. To avoid this, a recursive averaging of $\alpha_i$ i across the time frames may be performed as follows:

$$\bar{\alpha}_i(l)=(1-b)\bar{\alpha}_i(l-1)+b\alpha_i(l) \quad (48)$$

where l and l−1 index the current and previous time frames, respectively, and b is calculated from a time constant τ using the following formula:

$$b = 1 - e^{\frac{1}{R\tau}} \quad (49)$$

where R is the frame rate.

Target Loss Effects

Applying a beamformer to a noisy signal $x_k$ generally results in a suppression of the target signal $s_k$ at the output, i.e., a target loss. Formulation of the target loss requires a model for the speech distortion that is introduced by the beamformer. The simplest model is the additive noise model, i.e. speech distortion treated as additive noise uncorrelated with both speech and noise. With the additive noise model, the target loss A, in equation (28) is zero, and speech distortion is accounted for by adding it to the residual noise power as in equation (25). An alternative is to subtract the speech distortion from the clean speech power in addition to treating it as residual noise power. In this case, we have:

$$\Delta_i = \frac{1}{\beta_i}\sum_{k\in B_i}\omega_{i,k}(e_r - w_k)^H C_{s_k}(e_r - w_k) \quad (50)$$

which suggests that $\Lambda_i$ depends on the weight vector $w_k$. This renders the resulting optimization problem in equation (16) difficult to solve analytically. To mitigate this problem, we notice that due to the averaging with a large time constant (see above and section VI in [Zahedi et al.; 2021]), we have $\Lambda_i(l)\approx\Lambda_i(l-1)$, making it independent of $w_k(l)$. In practice, we did not observe any significant difference in the performances between the additive noise and the subtractive models.

Substituting equation (35) in (50) and using $C_{s_k}=\sigma_{s_k}^2 d_k d_k^H$ yields:

$$\Delta_i = \frac{1}{\beta_i}\sum_{k\in B_i}\omega_{i,k}\sigma_{s_k}^2\left|1 - \alpha_i u_k^H d_k - (1-\alpha_i)\left(w_k^{\mu MWF}\right)^H d_k\right|^2$$

$$\Delta_i = \frac{1}{\beta_i}\sum_{k\in B_i}\omega_{i,k}\sigma_{s_k}^2\left|(1-\alpha_i)\left(1-g_k^{(\mu)}\right) + \alpha_i(e_r - u_k)^H d_k\right|^2$$

where in equation (51), we have made use of the facts that $w_k^{\mu MWF}=g_k^{(\mu)}w_k^{MVDR}$ and $$(w_k^{MVDR})^H d_k = e_r^H d_k = 1$$

As seen in (51), dependency of $\Lambda_i$ on the weight vector is reflected by the presence of $\alpha_i$. From equations (51) and (28), one needs the knowledge of $a_i$ to calculate $P_{s_i}'$. On the other hand, $P_{s_i}'$ has to be known in order to calculate $\alpha_i$ in equation (36). As suggested above, to cope with this, we make use of the approximation $\tilde{\alpha}_i(l)=\tilde{\alpha}_i(l-1)$, i.e. we use $\alpha_i(l-1)$ to calculate $\Lambda_i(l)$ and $P_{s_i}'(l)$ in equations (51) and (28), respectively, and then update $\overline{\alpha}_i(l)$ using $P_{s_i}'(l)$.

1) Ambient-preserving mode: In this mode of operation, we have $u_k=e_r$. Substitution in equation (51) yields:

$$\Delta_i = \frac{(1-\alpha_i)^2}{\beta_i}\sum_{k\in B_i}\omega_{i,k}\sigma_{s_k}^2\left(1-g_k^{(\mu)}\right)^2 \quad (52)$$

2) Aggressive mode: In the aggressive mode, we have $u_k=w_k^R=g_k^{(\mu_2)}w_k^{MVDR}$. Substituting in equation (51), we obtain:

$$\Delta_i = \frac{1}{\beta_i}\sum_{k\in B_i}\omega_{i,k}\sigma_{s_k}^2\left|(1-\alpha_i)\left(1-g_k^{(\mu_1)}\right) + \alpha_i\left(1-g_k^{(\mu_2)}\right)\right|^2 \quad (53)$$

FIG. 1A shows a schematic block diagram of a first embodiment of a hearing device (HD), e.g. a hearing aid, according to the present disclosure. The hearing device may be adapted for being worn at or in an ear of a user, e.g. partly in an ear canal and partly at or behind pinna of the user. A target sound source S is illustrated in FIGS. 1A and 1B, and respective versions (s1, s2) of the target signal as transformed by acoustic transfer functions from the location of the sound source S to the locations of the first and second microphones (M1, M2) of the hearing device (HD) mounted at the ear of the user are shown by arrows to respective 'acoustic SUM-units' ('+'). The 'acoustic SUM-units' ('+') illustrate the mixing of the target sound source components with by (additive) noise components (v1, v2) to provide the acoustic input to the respective microphones M1 and M2. The hearing device comprises an input unit (IU) comprising at last two input transducers (here two microphones M1, M2), each for converting sound around the hearing device to an electric input signal representing said sound, thereby providing at least two electric input signals (here two time domain electric input signals x1(*n*), x2(*n*), where n represents time). The input unit (IU) may e.g. comprise appropriate analogue to digital converters to convert possible analogue output signals from the input transducers to corresponding digital signals (as respective streams of digital samples, see e.g. FIG. 4A, where n is a time index for the audio samples xm(n), m=1, 2). The hearing device further comprises a processor (PRO), e.g. a digital signal processor (DSP), connected to the input unit and configured to process the at least two electric input signals (x1(*n*), x2(*n*)) and to provide a processed output signal, here time domain signal o(n). The hearing device further comprises an output unit (OU) for converting the processed output signal to stimuli perceivable to the user as sound. In the embodiment of FIG. 1A, the output unit comprises an output transducer in the form of a loudspeaker (SPK) for converting the processed output signal o(n) to an acoustic signal comprising vibrations in air (directed towards an eardrum of the user when the hearing device is operationally mounted on the user). The output unit may comprise a digital to analogue converter for converting the stream of audio samples o(n) to an analogue electric output signal fed to the output transducer. The input unit (IU), the processor (PRO) and the output unit (OU) together comprise a forward (audio) path of the hearing device for processing the sound signals captured by the input unit and providing a processed signal as stimuli perceivable by the user as representative for said sound signals, e.g. by attenuating noise (and/or by enhancing a target signal) in said sound signals. The hearing device (e.g. the input unit (IU) or as here, the processor (PRO)) further comprises appropriate time domain to frequency domain converters (e.g. analysis filter banks (FB-A)) to convert the respective at least two electric input signals (here (x1(*n*), x2(*n*)) to frequency sub-band signals (in a time frequency representation, e.g. (k, l), where k is a frequency index and l is a time frame index. Each time-frame (index l) represents a spectrum of the electric input signal xm(n) (m=1, 2) providing e.g. complex values Xm(k, l), e.g. magnitude and phase) of the time domain signal at different frequency indices, k=1, . . . , K, where K is the number of frequency bins of the (analysis) filter bank (e.g. represented by a fast Fourier transform algorithm, e.g. Short Time Fourier Transform (STFT), or similar algorithm). Each bin (k, l) comprises a (complex) value of the converted signal (see e.g. FIG. 4B). The hearing device (e.g. the processor (PRO)) further comprises a beamformer filter (BF) comprising a minimum processing beamformer according to the present disclosure. The beamformer filter (BF) is configured to receive said at least two electric input signals and configured to provide a filtered signal (Y(k)) in dependence of said at least two electric input signals (X1($k$), X2($k$)) and adaptively determined beamformer weights (W1($k$), W2($k$)). The minimum processing beamformer is defined by the adaptively determined (optimized) beamformer weights (W1($k$), W2($k$)). The beamformer filter is configured apply the beamformer weights (W1($k$), W2($k$)) to the at least two electric input signals (Xm(k), m=1, 2, where the time index/l has been omitted for simplicity) to thereby provide the filtered signal Y(k). The filtered signal Y(k) is thus a linear combination of the electric input signals (X1($k$), X2($k$)), Y(k)=W1($k$) X1($k$)+W2($k$) X2($k$). The hearing device (e.g. the processor (PRO)) may further comprise a signal processing unit (G) for applying one or more algorithms to the filtered signal Y(k). The signal processing unit (G) may e.g. be configured to apply one or more of a (further) noise reduction algorithm, a (frequency and level dependent) compressive amplification algorithm, a feedback control algorithm, etc. and the provide the processed output signal O(k). The hearing device (e.g. the processor (PRO)) may further comprise a synthesis filter bank (FB-S) for converting the frequency sub-band signal O(k) to processed output signal o(n) in the time-domain.

In the embodiment of FIG. 1A, the hearing device comprise a weight estimation unit (WGT-EST) configured to perform the optimization of the beamformer weights (W1($k$), W2($k$)) of the minimum processing beamformer (BF).

The hearing device (HD), e.g. the processor (PRO), is configured to provide or receive a reference signal (REF) representing sound around said hearing device. The reference signal is termed $s_k^R$ (or $s_i^R$) in the mathematical outline above (eq. (1)-(53)), where k and i frequency bin and frequency sub-band indices, respectively (see e.g. FIG. 4B). The reference signal is defined by the signal REF-ctr input to the weight estimation unit (WGT-EST), either in the form of the reference signal itself or in the form of a control signal (e.g. from a user interface, cf. e.g. FIG. 6) defining which reference signal is currently selected. The provision may then be provided internally in the weight estimation unit (WGT-EST) in dependence of the at least two electric input signals (X1($k$), X2($k$)), etc.

The hearing device (HD), e.g. the processor (PRO), is configured to provide or receive a minimum value of a performance estimator for the beamformer filter. The minimum value is intended to ensure that the performance of the minimum processing beamformer is acceptable to the user, e.g. provides an acceptable speech intelligibility. The minimum value of a performance estimator may be stored in memory of the hearing device, or received from another device, e.g. via a user interface (e.g. provided by the user via the user interface, e.g. fully or partially implemented as an application program (APP) of a smartphone or similar portable communication device). In the embodiment of FIG. 1A, the minimum value of the performance estimator is defined by the signal Imin-ctr input to the weight estimation unit (WGT-EST). The control signal Imin-ctr may also comprise an option for choosing between different performance estimators (and thus different minimum values of the chosen performance estimator), cf. e.g. FIG. 6.

The hearing device (HD), e.g. the processor (PRO), e.g. as in FIG. 1A, the beamformer filter (BF), and in particular the weight estimation unit (WGT-EST), is configured to provide that the beamformer weights (W1($k$), W2($k$)) are adaptively determined in dependence of the the at least two electric input signals (X1($k$), X2($k$)), the reference signal (defined by REF-ctr) and the minimum value of the performance estimator (defined by Imin-ctr)

The weight estimation unit (WGT-EST) may be configured to optimize the beamformer weights (W1($k$), W2($k$)) of the minimum processing beamformer as signal dependent linear combination of at least two beam formers. The minimum processing (MP) beamformer may be written as $BF^{MP}=\alpha BF^1+(1-\alpha)BF^2$, where $BF^{MP}$ is the minimum processing beamformer, $BF^1$ is the reference beamformer, $BF^2$ may be a speech preserving beamformer (e.g. an MVF-beamformer) and a is the signal dependent weight of the linear combination.

Figure 5A:
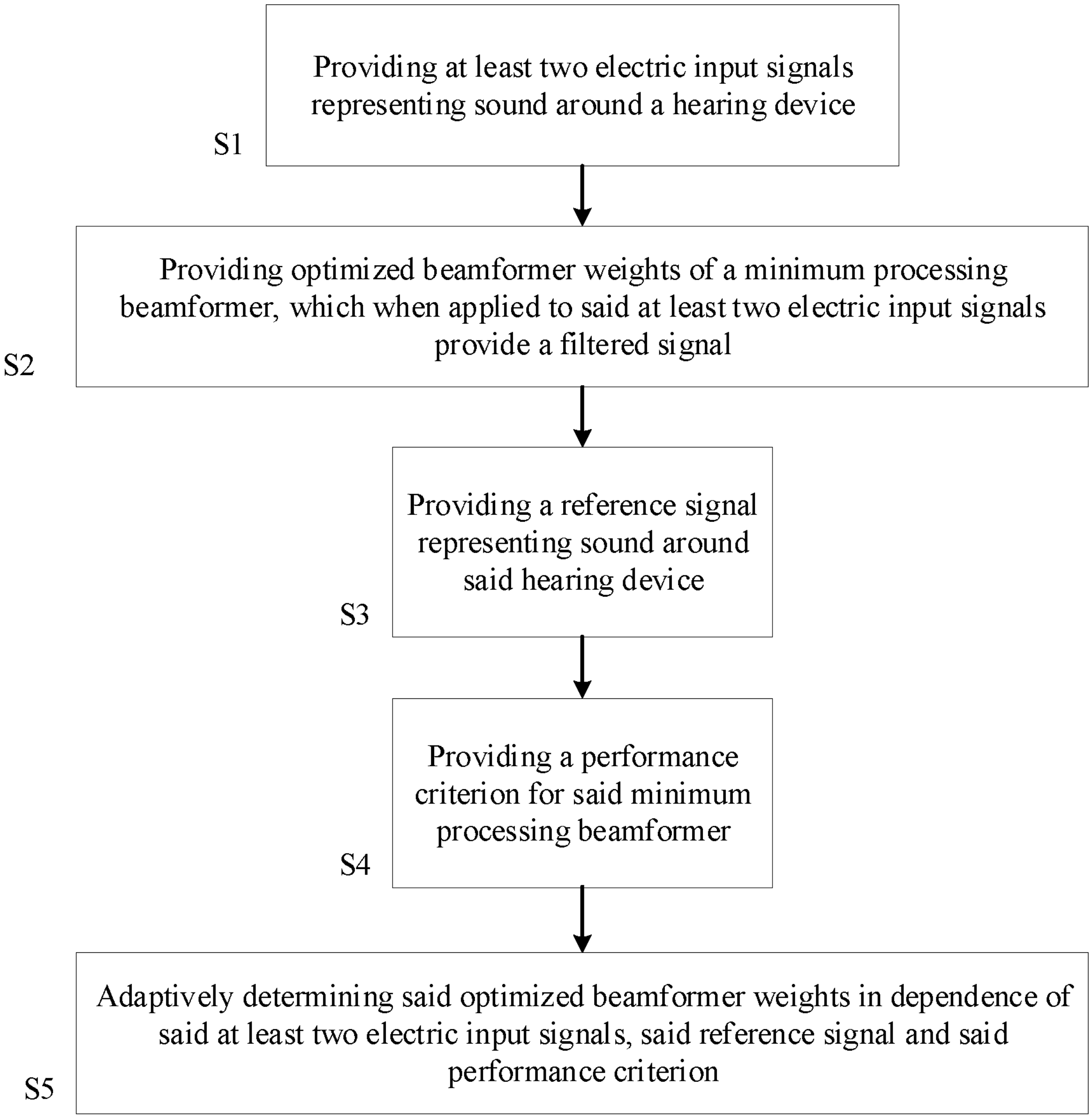
FIG. 5A shows a flow diagram for a method of operating a hearing device according to the present disclosure.
Figure 5B:
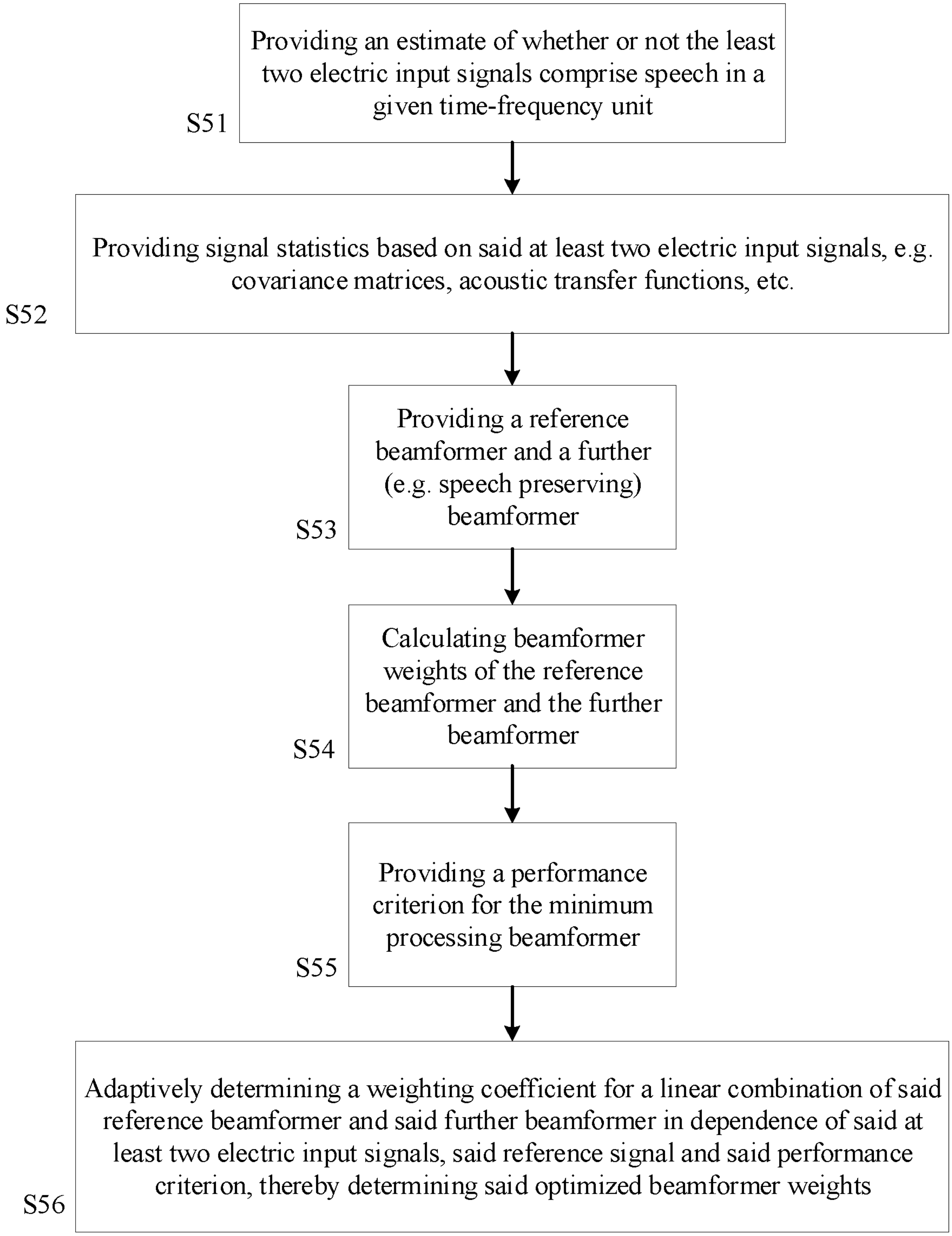
FIG. 5B shows a flow diagram for step S5 of the method of operating a hearing device of FIG. 5A.

An embodiment of the weight estimation unit (WGT-EST) is schematically illustrated in FIG. 1B and an algorithm for providing the optimize the beamformer weights (W1($k$), W2($k$)) of the minimum processing beamformer is shown in FIG. 5B.

FIG. 1B shows, a schematic block diagram of a second (partial) embodiment of a hearing device (HD') according to the present disclosure. The embodiment of FIG. 1B comprises the same components as FIG. 1A (input unit (IU), respective analysis filter banks (FB-A) and a beamformer filter providing filtered signal Y(k) (the rest of the hearing aid of FIG. 1A is not shown in FIG. 1B). Compared to the embodiment of FIG. 1A, FIG. 1B provides a more detailed embodiment of the weight estimation unit (WGT-EST).

The weight estimation unit (WGT-EST) of FIG. 1B comprises a voice activity detector (VAD) for estimating whether or not (or with what probability) an input signal comprises a voice signal (at a given point in time), e.g. at a frequency bin or frequency sub-band level. The voice activity detector unit may be adapted to classify a current acoustic environment of the user in a binary manner as a VOICE or NO-VOICE environment, or in a probabilistic manner as a speech presence probability (SPP). Thereby time segments of the at least two electric input signals comprising human utterances (e.g. speech) in the user's environment can be identified, and thus separated from time segments only (or mainly) comprising other sound sources (e.g. artificially generated noise). This is useful for determining 'signal statistics' of the at least two electric input signals performed in the signal statistics estimation block (SIG-STAT-EST) of the weight estimation unit (WGT-EST). Other detectors may be of relevance for the SIG-STAT-EST block, e.g. level detectors for estimating a current level of the at least two electric input signals. The detector signals (represented by signal SPP) are fed from the voice activity detector (VAD) to the signal statistics estimation block (SIG-STAT-EST) together with the at least two electric input signals (X1($k$), X2($k$)). The signal statistics may e.g. comprise a number of (frequency- and time-dependent) covariance matrices, e.g. $C_{x_k}$, $C_{s_k}$ and $C_{v_k}$, corresponding to the chosen signal model (e.g. x=s+v) for propagation of sound to the microphones of the hearing device (HD). Here $x_k$ is a vector representing the received (noisy) signals at the M microphones in the $k^{th}$ frequency band (i.e. $x_k=[x_1(k), x_M m(k)]^T$. Correspondingly, $s_k$, and $v_k$, represent the clean signal and the noise, respectively, at the M microphones in the $k^{th}$ frequency band (in the example of FIGS. 1A and 1B, M=2). Estimation of covariance matrices is e.g. described in EP2701145A1. Other signal statistics that may be determined in the SIG-STAT- EST block are (frequency- (and possibly time-) dependent) acoustic transfer functions (ATF) from different sound source locations to each of the microphones, e.g. in the form of relative acoustic transfer functions (RATF) from a selected reference (e.g. M1 in FIG. 1A, 1B) microphone to each of the other microphones of the hearing device (or system). Estimation of relevant transfer functions (e.g. the look (or steering) vector d) is e.g. described in EP2701145A1. The weight estimation unit (WGT-EST) of FIG. 1B further comprises a beamformer weight determination block (IND-BF-WGT-DET) for providing signal dependent beamformer weights $w_k$ for the relevant beamformers (e.g. for a reference beamformer (4) and a speech maintaining beamformer ($w_k^{\mu mwF}$)). In addition to the input signal (CovM-RTF) from the signal statistics estimation block (SIG-STAT-EST) and the at least two electric input signals (1($k$), X2($k$)), an input to the beamformer weight determination block (IND-BF-WGT-DET) is the choice of reference signal (or beamformer) indicated by signal REF-ctr, e.g. received from a user interface (see e.g. FIG. 6). The reference signal may be the result of the at least two electric signals having been filtered by the reference beamformer. Various aspects of the Multi-channel Wiener filter (MWF) and MVDR beamformers and post filters including the calculation of beamformer weights (or coefficients) is discussed in [Brandstein & Ward; 2001]. The beamformer weights (signal W1-W2) are fed to the optimization block (OPTIM-α) together with the at least two electric input signals (X1($k$), X2($k$)). The optimization block (OPTIM-a) additionally receives input signal Imin-ctr representing a minimum value of the performance estimator acceptable in the beamformed signal Y(k). The weight estimation unit (WGT-EST) is configured to determine optimized beamformer weights of a minimum processing beamformer as an optimal linear combination of at least two beamformers that minimizes processing of the input signals while (if at all possible) providing a minimum value of a performance estimator. The minimum processing (MP) beamformer may be written as $BF^{MP}=\alpha BF^1+(1-\alpha)BF^2$, where $BF^{MP}$ is the minimum processing beamformer, $BF^1$ is the reference beamformer, $BF^2$ may be a speech preserving beamformer (e.g. an MVF-beamformer) and a is the signal dependent weight of the linear combination. The optimization block (OPTIM-α) is configured to adaptively determine optimized linear combination weights α(k) in dependence of the current at least two electric input signals, to provide a minimum processing beamformer for the given choices of reference signal and speech maintaining beamformer, while fulfilling the chosen performance criterion. The signal dependent weight a may be dependent on a hearing characteristic of the user, e.g. on frequency dependent hearing thresholds. The optimization block (OPTIM-α) may be configured to provide a smoothing over time of the signal dependent weight α before its use in the final determination of optimized beamformer weights. The weight estimation unit (WGT-EST) of FIG. 1B further comprises a minimum processing beamformer weight determination block (RES-BF-WGT-DET) receiving input signals ALFA (optimized linear combination weights α(k)) and W1-W2 (beamformer weights of the reference and speech maintaining beamformers) from the optimization block (OPTIM-α). The beamformer weight determination block (RES-BF-WGT-DET) is configured to provide the optimized beamformer weights of the minimum processing beamformer as a linear combination of the beamformer weights of the at reference beamformer and the speech maintaining beamformer (determined in the beamformer weight determination block (IND-BF-WGT-DET)) using the optimized (linear combination-) weights α (determined in the optimization block (OPTIM-α)), cf. e.g. equations (35), (44), (45) in the exemplary mathematical outline above. The output of the beamformer weight determination block (RES-BF-WGT-DET) are the optimized beamformer weights (W1($k$), W2($k$)), which are applied to the at least two electric input signals (X1($k$), X2($k$)) in respective combination units ('X') whose outputs are combined in combination unit (+) to provide the filtered (beamformed) signal Y(k).

FIG. 2 schematically shows postfilter gain $g_k^{(\mu)}$ as a function of the SNR $\xi_k$ for the μMWF beamformer with three different values of μ.

FIG. 3 shows ANSI recommendation for the relationship between band audibility and speech-to-disturbance ratio (cf. [ANSI-53-22-1997]).

Figure 4A:
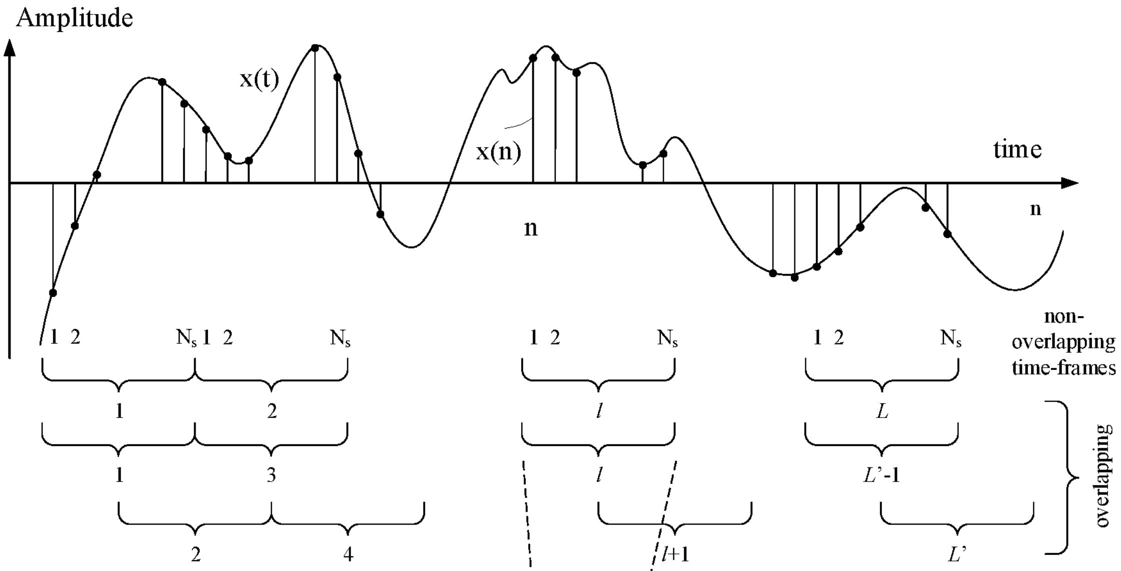

FIG. 4A schematically shows a time variant analogue signal ('Amplitude' vs 'time') and its digitization in samples, the samples being arranged in time frames, each comprising a number $N_s$ of samples. FIG. 4A shows an analogue electric signal x(t) (solid graph), e.g. representing an acoustic input signal, e.g. from a microphone, which is converted to a digital audio signal in an analogue-to-digital (AD) conversion process, where the analogue signal x(t) is sampled with a predefined sampling frequency or rate f $f_s$ being e.g. in the range from 8 kHz to 40 kHz (adapted to the particular needs of the application) to provide digital samples x(n) at discrete points in time n, as indicated by the vertical lines extending from the time axis with solid dots at its endpoint coinciding with the graph, and representing its digital sample value at the corresponding distinct point in time n. Each (audio) sample x(n) represents the value of the acoustic signal at n by a predefined number $N_b$ of bits, $N_b$ being e.g. in the range from 1 to 16 bits. A digital sample x(n) has a length in time of $1_s$e.g. 50 μs, for $f_s$=20 kHz. A number of (audio) samples $N_s$ are arranged in a time frame, as schematically illustrated in the lower part of FIG. 4A, where the individual (here uniformly spaced) samples (1, 2, . . . , $N_s$) are grouped in time frames (1, . . . , L). As also illustrated in the lower part of FIG. 4A, the time frames may be arranged consecutively to be non-overlapping (time frames 1, 2, . . . , l, . . . , L) or overlapping (here 50%, time frames 1, 2, . . . , l, . . . , L'), where l is a time frame index. A time frame may e.g. comprise 64 audio data samples. Other frame lengths may be used depending on the practical application. A time frame may e.g. have a duration of 3.2 ms.

Figure 4B:
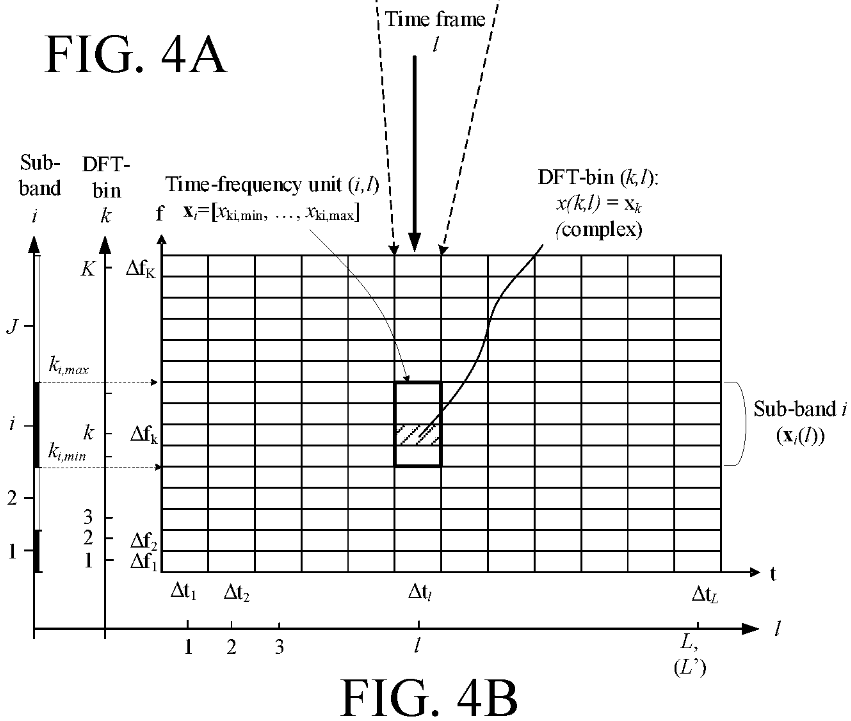

FIG. 4B schematically illustrates a time-frequency representation of the (digitized) time variant electric signal x(n) of FIG. 2A. The time-frequency representation comprises an array or map of corresponding complex or real values of the signal in a particular time and frequency range. The time-frequency representation may e.g. be a result of a Fourier transformation converting the time variant input signal x(n) to a (time variant) signal x(k,l) in the time-frequency (or filter bank) domain. In the expressions ((1)-(53)) outlined above, the notation $x_k$ is used instead of x(k,l), wherein the time index l is omitted. The Fourier transformation comprises a discrete Fourier transform algorithm (DFT), or a Short Time Fourier Transform (STFT), or similar algorithm. The frequency range considered by a typical hearing device (e.g. a hearing aid or a headset) from a minimum frequency $f_{min}$ to a maximum frequency $f_{max}$ comprises a part of the typical human audible frequency range from 20 Hz to 20 kHz, e.g. a part of the range from 20 Hz to 12 kHz. In FIG. 4B, the time-frequency representation x(k,l) ($x_k$) of signal x(n) comprises complex values of magnitude and/or phase of the signal in a number of DFT-bins (or tiles) defined by indices (k,l), where k=1, . . . , K represents a number K of frequency values (cf. vertical k-axis in FIG. 4B) and l=1, . . . , L (L') represents a number L (L') of time frames (cf. horizontal l-axis in FIG. 4B). A time frame is defined by a specific time index l and the corresponding K DFT-bins (cf. indication of Time frame l in the transition between FIG. 4A and FIG. 4B). A time frame l represents a frequency spectrum of signal x at time l. A DFT-bin or tile (k,l) comprising a (real) or complex value x(k,l) of the signal in question is illustrated in FIG. 4B by hatching of the corresponding field in the time-frequency map. A DFT-bin or time-frequency unit (k,m) may e.g. comprise a complex value of the signal: $x(k,m)=|x|\cdot e^{i\varphi}$, where x represents a magnitude and φ represents a phase of the signal in that time-frequency unit. Each value of the frequency index k corresponds to a frequency range $\Delta f_k$, as indicated in FIG. 4B by the vertical frequency axis f. Each value of the time index l represents a time frame. The time $\Delta t_l$ spanned by consecutive time indices depend on the length of a time frame (e.g. $\Delta t_1$=3.2 ms, e.g. for $f_s$=20 kHz and $N_s$=64) (cf. horizontal t-axis in FIG. 4B).

In the present application, a number J of (non-uniform) frequency sub-bands with sub-band indices 1=1, 2, . . . , J is defined, each sub-band comprising one or more DFT-bins (cf. vertical Sub-band i-axis in FIG. 4B). The $i^{th}$ sub-band (indicated by Sub-band i ($x_i(k,l)$) in the right part of FIG. 4B) comprises DFT-bins (or tiles) with lower and upper indices $k_i^{min}$ and $k_i^{max}$, respectively, e.g. defining lower and upper cut-off frequencies of the $i^{th}$ frequency sub-band, respectively. A specific time-frequency unit (i,l) is defined by a specific time index l and the DFT-bin indices from $k_i^{min}$ to $k_i^{max}$, as indicated in FIG. 4B by the bold framing around the corresponding DFT-bins (or tiles). A specific time-frequency unit (i,l) contains complex or real values of the $i^{th}$ sub-band signal $x_i(k,l)$ at time l, where $$x_i(k,l)=x_i=[x_{k_i}\min, \ldots, x_{k_i}\max]^T.$$

The frequency sub-bands i may e.g. be third octave bands. (e.g. to mimic the frequency dependent level sensitivity of the human auditory system). The time-frequency unit (i,l) may contain a single real or complex value of the signal (e.g. an average of the values ($x_{k_i}$ min, . . . , $x_{k_i}$ max), e.g. a weighted average), cf. e.g. eq. (6) above.

FIG. 5A shows a flow diagram for a method of operating a hearing device, e.g. a hearing aid, adapted for being worn at or in an ear of a user according to the present disclosure. The method comprises the steps of

- S1. providing at least two electric input signals representing sound around said hearing device;
- S2. providing optimized beamformer weights of a minimum processing beamformer, which when applied to said at least two electric input signals provide a filtered signal;
- S3. providing a reference signal representing sound around said hearing device;
- S4. providing a performance criterion for said minimum processing beamformer; and
- S5. adaptively determining said optimized beamformer weights in dependence of said at least two electric input signals, said reference signal and said performance criterion.

FIG. 5B shows a flow diagram for step S5 of the method of operating a hearing device of FIG. 5A. Step S5 may e.g. comprise the steps of

- S51. Providing an estimate of whether or not the least two electric input signals comprise speech in a given time-frequency unit;
- S52. Providing signal statistics based on said at least two electric input signals, e.g. covariance matrices, acoustic transfer functions, etc.;
- S53. Providing a reference beamformer and a further (e.g. speech preserving) beamformer;
- S54. Calculating beamformer weights of the reference beamformer and the further beamformer;
- S55. Providing a performance criterion for the minimum processing beamformer;
- S56. Adaptively determining a weighting coefficient for a linear combination of said reference beamformer and said further beamformer in dependence of said at least two electric input signals, said reference signal and said performance criterion, thereby determining said optimized beamformer weights.

The method of step S5 illustrated in FIG. 5B may e.g. be implemented in the weight estimation unit (WGT-EST) of FIG. 1A, 1B.

Figure 6:
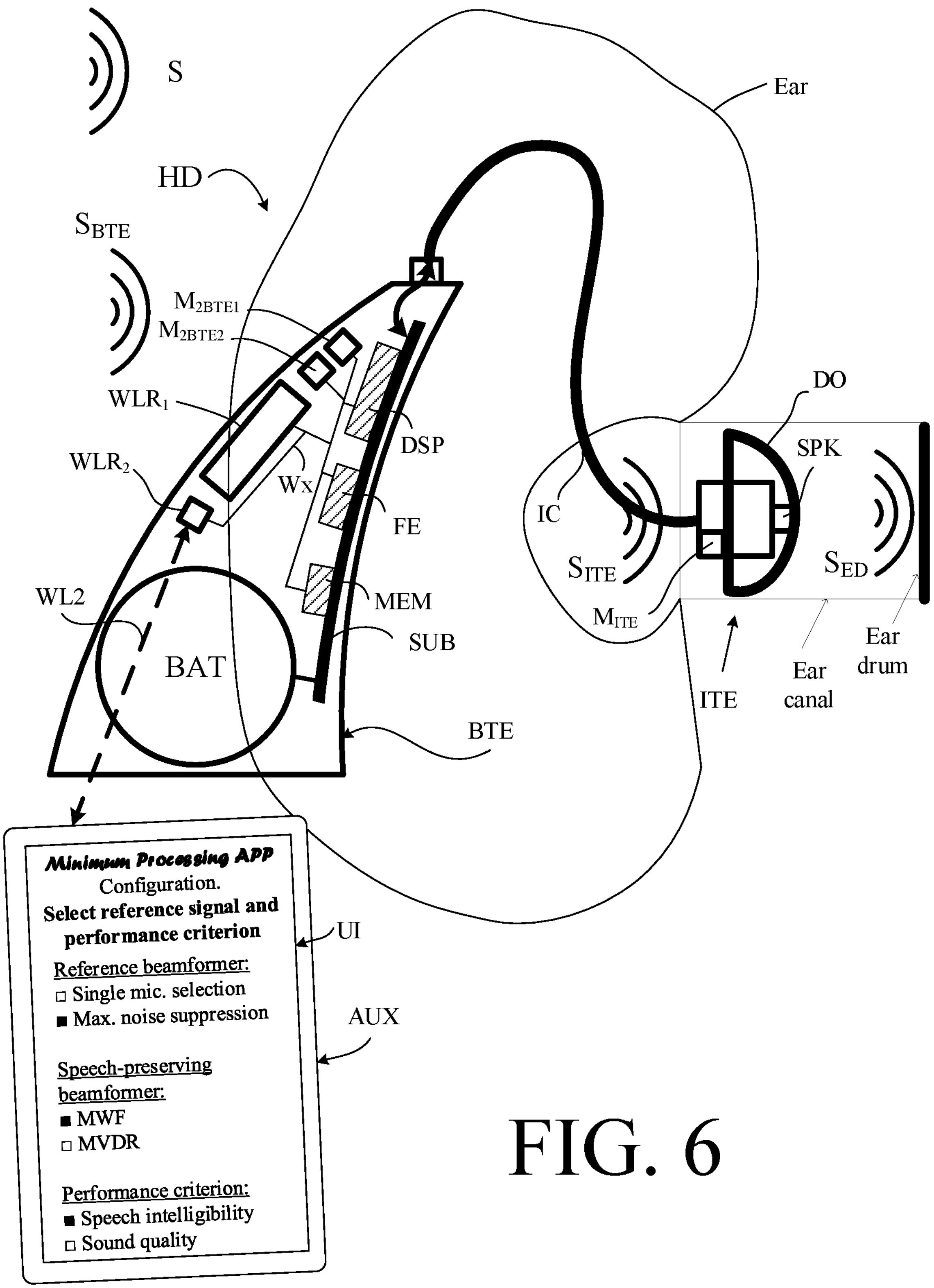
FIG. 6 shows an embodiment of a hearing aid according to the present disclosure comprising a BTE-part located behind an ear or a user and an ITE part located in an ear canal of the user in communication with an auxiliary device comprising a user interface for the hearing device.

FIG. 6 shows an embodiment of a hearing device (HD), e.g. a hearing aid, according to the present disclosure comprising a BTE-part located behind an ear or a user and an ITE part located in an ear canal of the user in communication with an auxiliary device (AUX) comprising a user interface (UI) for the hearing device. FIG. 6 illustrates an exemplary hearing aid (HD) formed as a receiver in the ear (RITE) type hearing aid comprising a BTE-part (BTE) adapted for being located behind pinna and a part (ITE) comprising an output transducer (OT, e.g. a loudspeaker/receiver) adapted for being located in an ear canal (Ear canal) of the user (e.g. exemplifying a hearing aid (HD) as shown in FIG. 1A). The BTE-part (BTE) and the ITE-part (ITE) are connected (e.g. electrically connected) by a connecting element (IC). In the embodiment of a hearing aid of FIG. 6, the BTE part (BTE) comprises two input transducers (here microphones) ($M_{BTE1}$, $M_{BTE2}$) each for providing an electric input audio signal representative of an input sound signal ($S_{BTE}$) from the environment (in the scenario of FIG. 6, from sound source S). The hearing aid of FIG. 6 further comprises two wireless receivers ($WLR_1$, $WLR_2$) for providing respective directly received auxiliary audio and/or information/control signals. The hearing aid (HD) comprises a substrate (SUB) whereon a number of electronic components are mounted, functionally partitioned according to the application in question (analogue, digital, passive components, etc.), but including a signal processor (DSP), a front end chip (FE), and a memory unit (MEM) coupled to each other and to input and output units via electrical conductors Wx. The mentioned functional units (as well as other components) may be partitioned in circuits and components according to the application in question (e.g. with a view to size, power consumption, analogue vs digital processing, radio communication, etc.), e.g. integrated in one or more integrated circuits, or as a combination of one or more integrated circuits and one or more separate electronic components (e.g. inductor, capacitor, etc.). The signal processor (DSP) provides an enhanced audio signal (cf. signal o(n) in FIG. 1A), which is intended to be presented to a user. In the embodiment of a hearing aid device in FIG. 6, the ITE part (ITE) comprises an output unit in the form of a loudspeaker (receiver) (SPK) for converting the electric signal (o(n)) to an acoustic signal (providing, or contributing to, acoustic signal $S_{ED}$ at the ear drum (Ear drum). The ITE-part further comprises an input unit comprising an input transducer (e.g. a microphone) ($M_{ITE}$) for providing an electric input audio signal representative of an input sound signal $S_{ITE}$ from the environment at or in the ear canal. In another embodiment, the hearing aid may comprise only the BTE-microphones ($M_{BTE1}$, $M_{BTE2}$). In yet another embodiment, the hearing aid may comprise an input unit ($IT_3$) located elsewhere than at the ear canal in combination with one or more input units located in the BTE-part and/or the ITE-part. The ITE-part further comprises a guiding element, e.g. a dome, (DO) for guiding and positioning the ITE-part in the ear canal of the user.

The hearing aid (HD) exemplified in FIG. 6 is a portable device and further comprises a battery (BAT) for energizing electronic components of the BTE- and ITE-parts.

The hearing aid (HD) comprises a directional microphone system (beamformer filter (BF in FIG. 1A, 1B)) adapted to enhance a target acoustic source among a multitude of acoustic sources in the local environment of the user wearing the hearing aid device. The memory unit (MEM) may comprise predefined (or adaptively determined) complex, frequency dependent constants defining predefined or (or adaptively determined) 'fixed' beam patterns (e.g. reference beamformer weights), performance criteria (e g minimum (intended) speech intelligibility measure), etc., according to the present disclosure, together defining or facilitating the calculation of the minimum processing beamformer weights and thus the beamformed signal Y(k) (cf. e.g. FIG. 1A, 1B).

The hearing aid of FIG. 6 may constitute or form part of a hearing aid and/or a binaural hearing aid system according to the present disclosure.

The hearing aid (HD) according to the present disclosure may comprise a user interface UI, e.g., as shown in the lower part of FIG. 6, implemented in an auxiliary device (AUX), e.g. a remote control, e.g. implemented as an APP in a smartphone or other portable (or stationary) electronic device. In the embodiment of FIG. 6, the screen of the user interface (UI) illustrates a Minimum Processing APP. As indicated in the top part of the screen by headlines 'Configuration. Select reference signal and performance criterion', the auxiliary device (AUX) and the hearing aid (HD) are configured to allow a user to configure the minimum processing beamformer according to the present disclosure via the user interface (UI). As indicated below the top part of the screen, the user interface allows the user to select a reference beamformer, a speech preserving beamformer, and a performance criterion (cf. underlined section headings). For each of the three sections, the available (here two) options are selectable via 'tick-boxes' (□ and ■, respectively) to the left of the option. The black square ■ indicates the present selection, whereas the open square □ indicates an un-selected option. For the Reference beamformer, a selection between a single microphone selection and a maximum noise suppression (e.g. an MVDR) beamformer) can be made. The Max. noise suppression beamformer is currently selected. For the Speech-preserving beamformer, a selection between a multi-channel Wiener filter (MWF) based beamformer and a Minimum Variance Distortion-less (MVDR) beamformer can be made. The MFF beamformer is currently selected. For the Performance criterion, a selection between a speech intelligibility based criterion (e.g. SII as exemplified in the present disclosure) or a sound quality criterion can be made. The speech intelligibility criterion is currently selected. Other aspects related to the configuration of the optimization of the minimum processing beamformer may be made configurable from the user interface. Some of the details of the different aspects may be stored in memory of the hearing device (or the auxiliary device), e.g. details of the performance criteria, e g minimum values different speech intelligibility measures (e.g. SII, STOI, etc.).

The auxiliary device and the hearing aid are adapted to allow communication of data representative of the reference signal, performance criterion, speech preserving beamformer, etc. currently selected by the user to the hearing aid via a, e.g. wireless, communication link (cf. dashed arrow WL2 to wireless receiver $WLR_2$ in the hearing aid of FIG. 6). The communication link WL2 may e.g. be based on far field communication, e.g. Bluetooth or Bluetooth Low Energy (or similar technology), implemented by appropriate antenna and transceiver circuitry in the hearing aid (HD) and the auxiliary device (AUX), indicated by transceiver unit $WLR_2$ in the hearing aid.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items.

The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Embodiments of the disclosure may e.g. be useful in applications such as hearing aids or headsets.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Zahedi et al.; 2021] Adel Zahedi, Michael Sy skind Pedersen, Jan stergaard, Thomas Ulrich Christiansen, Lars Bramslow, Jesper Jensen, "*Minimum Processing Beamforming*", accepted for publication in IEEE Transactions on Audio, Speech, and Language Processing, 2021. Published 21 Jan. 2021 (https://ieeexplore.ieee.org/document/9332253).

[ANSI S3.22-1997] *"Methods for calculation of the speech intelligibility index"*, American National Standard Institute (ANSI), 1997.

[Van den Bogaert et al, 2009] T. Van den Bogaert, S. Doclo, J. Wouters, and M. Moonen, "*Speech enhancement with multichannel wiener filter techniques in multimicrophone binaural hearing aids*", J. Acoust. Soc. Am. (JASA), vol. 125, no. 1, pp. 360-371, 2009.

EP2701145A1 (Retune, Oticon) 26 Feb. 2014.

[Brandstein & Ward; 2001] M. Brandstein and D. Ward, "*Microphone Arrays*", Springer 2001.

[Taal et al.; 2011] Cees H. Taal, Richard C. Hendriks, Richard Heusdens, and Jesper Jensen, "*An Algorithm for Intelligibility Prediction of Time-Frequency Weighted Noisy Speech*", IEEE Transactions on Audio, Speech and Language Processing, vol. 19, no. 7, 1 Sep. 2011, pages 2125-2136.

The invention claimed is:

1. A hearing device adapted for being worn at or in an ear of a user, the hearing device comprising an input unit comprising at last two input transducers each for converting sound around said hearing device to an electric input signal representing said sound, thereby providing at least two electric input signals;

a beamformer filter comprising a minimum processing beamformer defined by optimized beamformer weights, the beamformer filter being configured to provide a filtered signal in dependence of said at least two electric input signals and said optimized beamformer weights, the optimized beamformer weights being calculated based on a reference signal representing sound around said hearing device, wherein said reference signal is a beamformed signal obtained by processing the at least two electric input signals with different beamformer weights than the optimized beamformer weights defining the minimum processing beamformer;

wherein the beamformer filter is further configured to receive a performance criterion for said minimum processing beamformer;

wherein the minimum processing beamformer is a beamformer that provides the filtered signal with as little modification as possible in terms of a selected distance measure compared to said reference signal, while still fulfilling said performance criterion; and wherein said optimized beamformer weights are adaptively determined in dependence of said at least two electric input signals, said reference signal, said distance measure, and said performance criterion; and wherein said reference signal is a beamformed signal generated by a reference beamformer; and wherein said minimum processing beamformer is determined as a signal dependent linear combination of at least two beam formers, wherein one of said at least two beamformers is said reference beamformer, the minimum processing beamformer is composed of a dynamic, signal dependent, linear combination of the reference beamformer and a speech-preserving beamformer, the reference beamformer is configured to remove as much noise as possible and comprises one of a multi-channel Wiener filter, a minimum variance distortionless response beamformer, a linearly-constrained minimum variance beamformer, and a DNN-based beamformer, and the speech-preserving beamformer is configured to preserve speech and comprises one of a multi-channel Wiener filter and a minimum variance distortionless response beamformer.

2. A hearing device according to claim 1 wherein said optimized beamformer weights are adaptively determined on a per frequency sub-band level.

3. A hearing device according to claim 1 wherein said performance criterion relates to a performance estimator for said minimum processing beamformer being larger than or equal to a minimum value.

4. A hearing device according to claim 3 wherein said performance estimator comprises an algorithmic speech intelligibility measure or a signal quality measure.

5. A hearing device according to claim 1 wherein the calculation of said optimized beamformer weights includes calculating said distance measure based on a squared error between the reference signal and the filtered signal.

6. A hearing device according to claim 1 comprising a filter bank allowing processing of said at least two electric input signals, or a signal or signals originating therefrom, in the time-frequency domain where said electric input signals are provided in a time frequency representation k, l, where k is said frequency index and/is a time index.

7. A hearing device according to claim 1 wherein the linear combination comprises a signal dependent weight a, which is adaptively updated in dependence of the at least two electric input signals.

8. A hearing device according to claim 7 wherein said signal dependent weight a is adaptively updated in dependence of said at least two electric input signals and said reference signal.

9. A hearing device according to claim 7 configured to provide a smoothing over time of the signal dependent weight a.

10. A hearing device according to claim 1 being constituted by or comprising a hearing aid.

11. A hearing device according to claim 1 wherein said hearing device is constituted by or comprises an air-conduction type hearing aid, a bone-conduction type hearing aid, a cochlear implant type hearing aid, a headset or an earphone, or a combination thereof.

12. A hearing device according to claim 1 wherein said reference signal is a beamformed signal provided as a result of the at least two electric signals having been filtered by the reference beamformer.

13. A hearing device according to claim 1 wherein the reference beamformer is an aggressive, noise suppressing beamformer.

14. A hearing device according to claim 13 wherein the reference beamformer comprises the multi-channel Wiener filter.

15. A hearing device according to claim 1 wherein the reference beamformer comprises the multi-channel Wiener filter configured to remove as much noise as possible in the beamformed signal, and the speech-preserving beamformer comprises the multi-channel Wiener filter configured to preserve speech.

16. A method of operating a hearing device adapted for being worn at or in an ear of a user, the method comprising providing at least two electric input signals representing sound around said hearing device;

providing optimized beamformer weights of a minimum processing beamformer, which when applied to said at least two electric input signals provide a filtered signal, the optimized beamformer weights being calculated based on a reference signal representing sound around said hearing device, wherein said reference signal is a beamformed signal obtained by processing the at least two electric input signals with different beamformer weights than the optimized beamformer weights defining the minimum processing beamformer;

providing a performance criterion for said minimum processing beamformer;

wherein the minimum processing beamformer is a beamformer that provides the filtered signal with as little modification as possible in terms of a selected distance measure compared to said reference signal, while still fulfilling said performance criterion; and wherein the method further comprises adaptively determining said optimized beamformer weights in dependence of said at least two electric input signals, said reference signal, said distance measure, and said performance criterion; and said reference signal is a beamformed signal generated by a reference beamformer;

wherein said minimum processing beamformer is determined as a signal dependent linear combination of at least two beam formers, wherein one of said at least two beamformers is said reference beamformer, wherein the minimum processing beamformer is composed of a dynamic, signal dependent, linear combination of the reference beamformer and a speech-preserving beamformer, wherein the reference beamformer is configured to remove as much noise as possible and comprises one of a multi-channel Wiener filter, a minimum variance distortionless response beamformer, a linearly-constrained minimum variance beamformer, and a DNN-based beamformer, and wherein the speech-preserving beamformer is configured to preserve speech and comprises one of a multi-channel Wiener filter and a minimum variance distortionless response beamformer.

17. A method according to claim 16 comprising providing an estimate of whether or not the least two electric input signals comprise speech in a given time-frequency unit and providing signal statistics based on said at least two electric input signals.

18. A method according to claim 17 comprising providing signal statistics based on said at least two electric input signals as covariance matrices or acoustic transfer functions.

* * * * *